(12) United States Patent
Yuk et al.

(10) Patent No.: US 10,367,368 B2
(45) Date of Patent: Jul. 30, 2019

(54) WIRELESS POWER TRANSFER METHOD AND WIRELESS POWER TRANSMITTER

(71) Applicant: LG ELECTRONICS INC., Seoul (KR)

(72) Inventors: Gyunghwan Yuk, Seoul (KR); Jaesung Lee, Seoul (KR); Jaesoon Kwon, Seoul (KR); Jinsup Park, Seoul (KR); Jeongkyo Seo, Seoul (KR); Byungsang Jung, Seoul (KR); Youngchan Cho, Seoul (KR)

(73) Assignee: LG ELECTRONIC INC., Seoul (KR)

( * ) Notice: Subject to any disclaimer, the term of this patent is extended or adjusted under 35 U.S.C. 154(b) by 128 days.

(21) Appl. No.: 15/484,728

(22) Filed: Apr. 11, 2017

(65) Prior Publication Data
US 2017/0294798 A1     Oct. 12, 2017

Related U.S. Application Data

(60) Provisional application No. 62/321,213, filed on Apr. 12, 2016.

(30) Foreign Application Priority Data

Mar. 29, 2017    (KR) ........................ 10-2017-0040220

(51) Int. Cl.
*H02J 7/00*      (2006.01)
*H02J 7/02*      (2016.01)
(Continued)

(52) U.S. Cl.
CPC .............. *H02J 7/025* (2013.01); *H02J 50/12* (2016.02); *H02J 50/40* (2016.02); *H02J 50/80* (2016.02);
(Continued)

(58) Field of Classification Search
USPC .......................................... 320/108
See application file for complete search history.

(56) References Cited

U.S. PATENT DOCUMENTS

2010/0253153 A1* 10/2010 Kondo ................ H01F 27/2876
                                                            307/104
2012/0326662 A1* 12/2012 Matsumoto ............. H02J 7/025
                                                            320/108
(Continued)

FOREIGN PATENT DOCUMENTS

KR    10-2014-0025410 A    3/2014
KR    10-2014-0110673 A    9/2014
(Continued)

*Primary Examiner* — Samuel Berhanu
(74) *Attorney, Agent, or Firm* — Birch, Stewart, Kolasch & Birch, LLP

(57) ABSTRACT

The present relates to a wireless power transmitter performing communication with a wireless power receiver, and a wireless power transfer method thereof. The wireless power transmitter includes a power conversion unit configured to transmit a wireless power signal transferred in a form of an energy field, such as an electric field, a magnetic field or an electromagnetic field, and a power transmission control unit configured to transfer power to the wireless power receiver using the wireless power signal, wherein the power transmission control unit is configured to control the power conversion unit to transmit a near-field communication (NFC) detection signal, other than the wireless power signal, when a preset condition is satisfied, and wherein the power transmission control unit controls the wireless conversion unit in a different manner according to whether or not a response signal to the NFC detection signal is detected.

17 Claims, 20 Drawing Sheets

(51) Int. Cl.
*H02J 50/12* (2016.01)
*H02J 50/80* (2016.01)
*H04B 5/00* (2006.01)
*H02J 50/40* (2016.01)
*H02J 50/90* (2016.01)
*H01F 38/14* (2006.01)

(52) U.S. Cl.
CPC ........... *H04B 5/0037* (2013.01); *H01F 38/14* (2013.01); *H01F 2038/143* (2013.01); *H02J 50/90* (2016.02)

(56) References Cited

U.S. PATENT DOCUMENTS

2014/0253026 A1* 9/2014 Du .................. H02J 5/005
 320/108
2015/0280453 A1* 10/2015 Ikefuji ............. H04B 5/0037
 320/108

FOREIGN PATENT DOCUMENTS

| | | | |
|---|---|---|---|
| KR | 10-2014-0131428 A | 11/2014 | |
| KR | 10-2015-0137543 A | 12/2015 | |
| WO | WO 2013/088220 A2 | 6/2013 | |
| WO | WO 2015/020683 A1 | 2/2015 | |

* cited by examiner

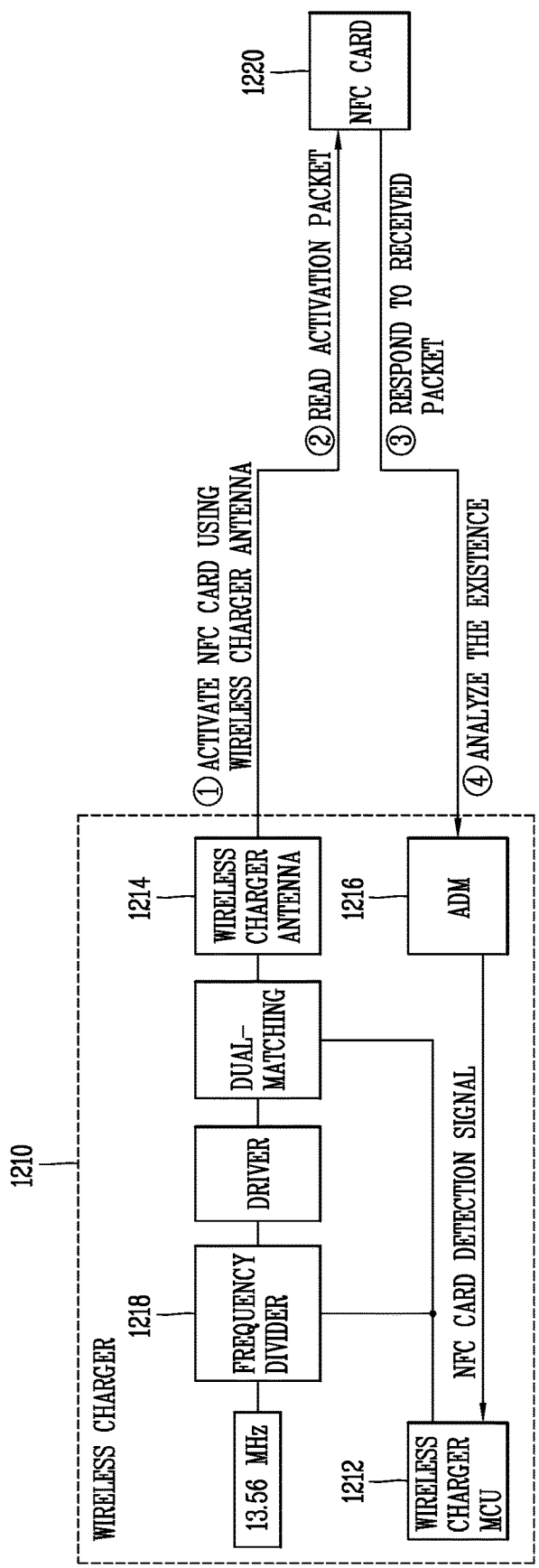

WIRELESS POWER TRANSFER METHOD AND WIRELESS POWER TRANSMITTER

CROSS-REFERENCE TO RELATED APPLICATION

Pursuant to 35 U.S.C. § 119(a), this application claims the benefit of an earlier filing date of and the right of priority to Korean Application No. 10-2017-0040220, filed on Mar. 29, 2017 and U.S. Provisional Application No. 62/321,213, filed on Apr. 12, 2016, the contents of which are incorporated by reference herein in its entirety.

TECHNICAL FIELD

The present disclosure relates to a wireless power transfer method and a wireless power transmitter (or wireless power transfer apparatus) in a wireless power transfer field.

BACKGROUND ART

In recent years, the method of contactlessly supplying electrical energy to wireless power receivers in a wireless manner has been used instead of the traditional method of supplying electrical energy in a wired manner. The wireless power receiver receiving energy in a wireless manner may be directly driven by the received wireless power, or a battery may be charged by using the received wireless power, then allowing the wireless power receiver to be driven by the charged power.

For allowing smooth wireless power transfer between a wireless power transmitter which transmits power in a wireless manner and a wireless power receiver which receives power in a wireless manner, the standardization for a technology related to the wireless power transfer is undergoing.

As part of the standardization for the wireless power transfer technology, the Wireless Power Consortium (WPC) which manages technologies for a magnetic inductive wireless power transfer has published a standard document "System description Wireless Power Transfer, Volume 1, Low Power, Part 1: Interface Definition, Version 1.00 Release Candidate 1 (RC1)" for interoperability in the wireless power transfer on Apr. 12, 2010.

On the other hand, Power Matters Alliance as another technology standardization consortium has been established in March 2012, developed a product line of interface standards, and published a standard document based on an inductive coupling technology for providing inductive and resonant power.

In addition, there is Alliance for Wireless Power (A4WP) to standardize a wireless charging technology according to a magnetic resonance method. The magnetic resonance method generates a magnetic field in a transmitter coil and transmits power only to a receiver coil having the same frequency.

The wireless charging method using the electromagnetic induction as described above is already frequently encountered in our lives. For example, electric toothbrushes, wireless coffee pots, and the like employ the wireless charging method using the electromagnetic induction.

In addition, various short-range wireless communication technologies are being developed. For example, the short-range wireless communication technologies may include Bluetooth, Near Field Communication (NFC), Magnetic Secure Transmission (MST), Beacon, Zigbee, Wi-Fi and the like.

With the development of various short-range wireless communication technologies as well as the wireless charging method, wireless charging may affect electronic components provided in other devices. This is because the wireless charging is performed by a wireless power signal transmitted in a form of an energy field such as an electric field, a magnetic field or an electromagnetic field. For example, the energy field generated during the wireless charging may be induced in an antenna provided in another device, thereby damaging electronic components of the another device.

DISCLOSURE OF THE INVENTION

The present invention is to solve the aforementioned problems and other drawbacks.

One aspect of the present invention is to provide a wireless power transfer method and apparatus capable of preventing damage on an electronic component provided in another device.

Another aspect of the present invention is to provide a wireless power transfer method and apparatus capable of searching for an electronic device that performs short-range wireless communication using a coil for transferring wireless power.

One embodiment according to the present invention for realizing the aspects relates to a wireless power transmitter (wireless power transfer apparatus) that performs communication with a wireless power receiver (wireless power receiving apparatus). The wireless power transmitter may include a power conversion unit configured to transmit a wireless power signal transferred in a form of an energy field, such as an electric field, a magnetic field or an electromagnetic field, and a power transmission control unit configured to transfer power to the wireless power receiver using the wireless power signal, wherein the power transmission control unit may be configured to control the power conversion unit to transmit a near-field communication (NFC) detection signal, other than the wireless power signal, when a preset condition is satisfied, and wherein the power transmission control unit may control the wireless conversion unit in a different manner according to whether or not a response signal to the NFC detection signal is detected.

In one embodiment disclosed herein, the power transmission control unit may control the power conversion unit such that a power transfer method is changed or power is not transferred to the wireless power receiver, when the response signal is detected.

In one embodiment disclosed herein, the wireless power transmitter cannot execute charging in a magnetic resonance scheme when the NFC is detected, and thus change the magnetic resonance scheme into a magnetic induction scheme. In detail, when the power transfer method is changed, the power transmission control unit may control the power conversion unit to switch a frequency of the wireless power signal from one of a first frequency and a second frequency into another one. The power transmission control unit may restrict the transmission of the wireless power signal using the one frequency when the frequency of the wireless power signal is switched into the another one.

In one embodiment disclosed herein, the power transmission control unit may restrict the transmission of the wireless power signal through the power conversion unit when the response signal to the NFC detection signal is detected.

In one embodiment disclosed herein, the power conversion unit may include a coil. One of the wireless power signal and the NFC detection signal may be selectively transmitted through the coil. Accordingly, an NFC antenna can be searched by using the coil provided for wireless charging, even without a separate antenna.

In one embodiment disclosed herein, the transmitter may further include an NFC detection unit configured to detect distortion generated by the response signal from the energy field formed by the NFC detection signal.

In one embodiment disclosed herein, the NFC detection unit may be a demodulator having at least one filter for detecting the distortion. The demodulator is fabricated at lower cost than the NFC antenna, which may result in producing the wireless power transmitter at low cost.

In one embodiment disclosed herein, the power conversion unit may modulates the NFC detection signal such that a packet is included in the NFC detection signal, when the NFC detection signal is transmitted, and the packet may be formed to be demodulated by an NFC device allowed to perform near field communication (NEC).

In one embodiment disclosed herein, the transmitter may further include a multiplexer configured to selectively transmit one of the wireless power signal and the NFC detection signal to the power conversion unit based on the control of the power transmission control unit.

In one embodiment disclosed herein, the transmitter may further include a frequency divider configured to generate the wireless power signal using the NFC detection signal based on the control of the power transmission control unit.

In one embodiment disclosed herein, the wireless power signal and the NFC detection signal may have an integer ratio therebetween. The wireless power signal and the NFC detection signal can selectively be output using one signal, thereby lowering a production cost.

In one embodiment disclosed herein, the case where the preset condition is satisfied may correspond to a case where a temperature received from a temperature sensor is higher than a reference temperature. In addition, various conditions for transmitting the NFC detection signal can be set.

In one embodiment disclosed herein, the power transmission control unit may output notification information notifying that an NFC device has been detected, when the response signal is detected. A vehicle receiving the notification signal may request a passenger to remove the NFC device which is located within a wireless charging box. Or, the vehicle may notify that wireless charging is not to be performed until the NFC device is removed from the wireless charging box.

Meanwhile, one embodiment of the present invention relates to a wireless power transfer method of a wireless power transmitter for transferring power to a wireless power receiver. The wireless power transfer method may include transmitting a near-field communication (NFC) detection signal using a wireless charging coil when a wireless charging request is received, detecting a response signal to the NFC detection signal, controlling the wireless charging coil not to transfer power to the wireless power receiver, when the response signal is detected within a predetermined time, and transmitting a wireless power signal using the wireless charging coil to transfer power to the wireless power receiver when the predetermined time elapses without a detection of the response signal.

In one embodiment disclosed herein, one of the wireless power signal and the NFC detection signal may be selectively transmitted through the wireless charging coil.

In one embodiment disclosed herein, the detecting the response signal may include detecting distortion, generated by the response signal, from an energy field formed by the NFC detection signal using a demodulator having at least one filter, and detecting the response signal using the distortion.

In one embodiment disclosed herein, the method may further include modulating the NFC detection signal such that a packet is included in the NFC detection signal, when the NFC detection signal is transmitted. The packet may be demodulated by an NFC device allowed to perform near-field communication (NFC).

In one embodiment disclosed herein, one of the wireless power signal and the NFC detection signal may be selectively transmitted to the wireless charging coil by a multiplexer.

In one embodiment disclosed herein, the wireless power signal may be generated from the NFC detection signal by a frequency divider, and the wireless power signal and the NFC detection signal may have an integer ratio therebetween.

In one embodiment disclosed herein, the method may further include outputting notification information notifying that an NFC device has been detected when the response signal is detected.

Also, the present invention can extend up to a vehicle having the wireless power transmitter or a vehicle that performs a wireless power transfer method.

The wireless power transfer method and the wireless power transmitter according to the present invention may provide the following effects.

According to the present invention, a wireless power signal for transferring power is transmitted when an NFC device is not present within a predetermined range. Since the transmission of the wireless power signal is restricted when the NFC device is present, damage caused on the NFC device can be prevented in advance.

In addition, an NFC detection signal for searching for the NFC signal can be transmitted through a wireless charging coil for transmitting the wireless power signal, and a response signal of the NFC device can be detected using a demodulator. Accordingly, a separate communication module for short-range communication may not be needed. The demodulator is implemented as a simple circuit but the communication module requires a large amount of cost and a large space as compared with the demodulator. Therefore, a production cost can be reduced.

BRIEF DESCRIPTION OF THE DRAWINGS

FIGS. 16A to 16C are block diagrams of a wireless power transmitter for executing the wireless power transfer method of FIG. 14, namely, a wireless power transmitter having a frequency divider.

DETAILED DESCRIPTION OF THE PREFERRED EMBODIMENTS

Figure 1:
FIG. 1 is an exemplary view conceptually illustrating a wireless power transmitter and a wireless power receiver according to embodiments of the present invention.

The technologies disclosed herein may be applicable to wireless power transmission or transfer (contactless power transmission). However, the technologies disclosed herein are not limited to this, and may be also applicable to all kinds of power transmission systems and methods, wireless charging circuits and methods to which the technological spirit of the technology can be applicable, in addition to the methods and apparatuses using power transmitted in a wireless manner.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

In addition, a suffix "module" or "unit" used for constituent elements disclosed in the following description is merely intended for easy description of the specification, and the suffix itself does not give any special meaning or function.

Furthermore, the terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

Hereinafter, preferred embodiments of the present invention will be described in detail with reference to the accompanying drawings, and the same or similar elements are designated with the same numeral references regardless of the numerals in the drawings and their redundant description will be omitted.

In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

FIG. 1 is an exemplary view conceptually illustrating a wireless power transmitter and a wireless power receiver according to embodiments of the present invention.

Referring to FIG. 1, the wireless power transmitter 100 may be a power transfer apparatus configured to transfer power required for the wireless power receiver 200 in a wireless manner.

Furthermore, the wireless power transmitter 100 may be a wireless charging apparatus configured to charge a battery of the wireless power receiver 200 by transferring power in a wireless manner.

Additionally, the wireless power transmitter 100 may be implemented with various forms of apparatuses transferring power to the wireless power receiver 200 requiring power in a contactless state.

The wireless power receiver 200 is an apparatus that is operable by receiving power from the wireless power transmitter 100 in a wireless manner. Furthermore, the wireless power receiver 200 may charge a battery using the received wireless power.

On the other hand, an electronic device for receiving power in a wireless manner as described herein should be construed broadly to include a portable phone, a cellular phone, a smart phone, a personal digital assistant (PDA), a portable multimedia player (PMP), a tablet, a multimedia device, or the like, in addition to an input/output device such as a keyboard, a mouse, an audio-visual auxiliary device, and the like.

The wireless power receiver 200, as described later, may be a mobile communication terminal (for example, a portable phone, a cellular phone, and a tablet and the like) or a multimedia device.

On the other hand, the wireless power transmitter 100 may transfer power in a wireless manner without mutual contact to the wireless power receiver 200 using one or more wireless power transfer methods. In other words, the wireless power transmitter 100 may transfer power using at least one of an inductive coupling method based on magnetic induction phenomenon by the wireless power signal and a magnetic resonance coupling method based on electromagnetic resonance phenomenon by a wireless power signal at a specific frequency.

Wireless power transfer in the inductive coupling method is a technology transferring power in a wireless manner using a primary coil and a secondary coil, and refers to the transmission of power by inducing a current from a coil to another coil through a changing magnetic field by a magnetic induction phenomenon.

Wireless power transfer in the inductive coupling method refers to a technology in which the wireless power receiver 200 generates resonance by a wireless power signal transmitted from the wireless power transmitter 100 to transfer power from the wireless power transmitter 100 to the wireless power receiver 200 by the resonance phenomenon.

Hereinafter, the wireless power transmitter 100 and wireless power receiver 200 according to the embodiments disclosed herein will be described in detail. In assigning reference numerals to the constituent elements in each of the following drawings, the same reference numerals will be used for the same constituent elements even though they are shown in a different drawing.

Figure 2A:
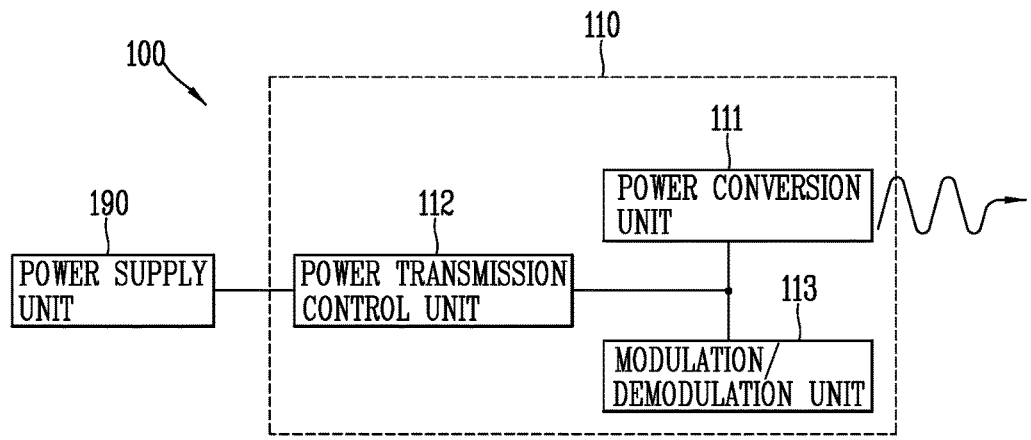
FIGS. 2A and 2B are exemplary block diagrams illustrating configurations of a wireless power transmitter and a wireless power receiver that can be employed in the embodiments disclosed herein.
Figure 2B:
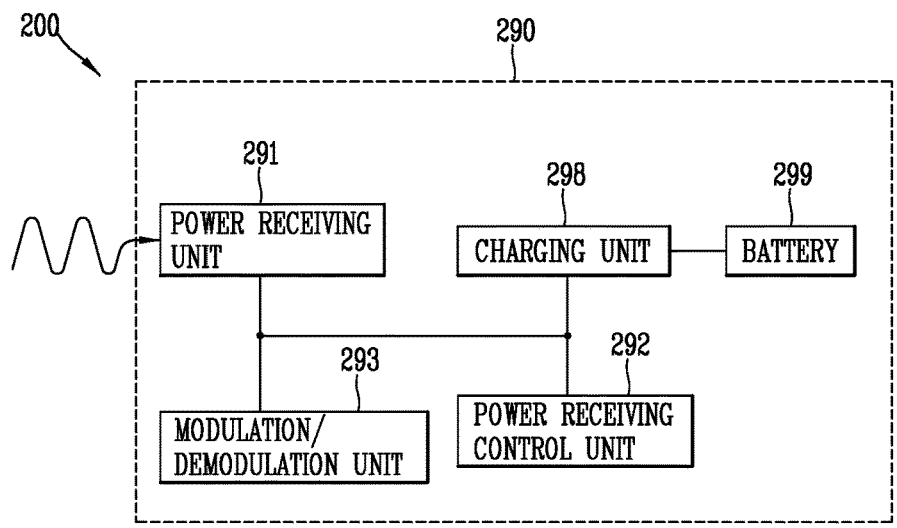

FIGS. 2A and 2B are exemplary block diagrams illustrating the configurations of the wireless power transmitter 100 and the wireless power receiver 200 that can be employed in the embodiments disclosed herein.

Referring to FIG. 2A, the wireless power transmitter 100 may include a power transmission unit 110. The power transmission unit 110 may include a power conversion unit 111 and a power transmission control unit 112.

The power conversion unit 111 transfers power supplied from a transmission side power supply unit 190 to the wireless power receiver 200 by converting it into a wireless power signal. The wireless power signal transferred by the power conversion unit 111 is generated in the form of a magnetic field or electro-magnetic field having an oscillation characteristic. For this purpose, the power conversion unit 111 may be configured to include a coil for generating the wireless power signal.

The power conversion unit 111 may include a constituent element for generating a different type of wireless power signal according to each power transfer method. For example, the power conversion unit 111 may include a primary coil for forming a changing magnetic field to induce a current to a secondary coil of the wireless power receiver 200. Furthermore, the power conversion unit 111 may include a coil (or antenna) for forming a magnetic field having a specific resonant frequency to generate a resonant frequency in the wireless power receiver 200 according to the resonance coupling method.

Furthermore, the power conversion unit 111 may transfer power using at least one of the foregoing inductive coupling method and the resonance coupling method.

Among the constituent elements included in the power conversion unit 111, those for the inductive coupling method will be described later with reference to FIGS. 4A, 4B and 5, and those for the resonance coupling method will be described with reference to FIGS. 7A, 7B and 8.

On the other hand, the power conversion unit 111 may further include a circuit for controlling the characteristics of a used frequency, an applied voltage, an applied current or the like to form the wireless power signal.

The power transmission control unit 112 controls each of the constituent elements included in the power transmission unit 110. The power transmission control unit 112 may be implemented to be integrated into another control unit (not shown) for controlling the wireless power transmitter 100.

On the other hand, a region to which the wireless power signal can be approached may be divided into two types. First, an active area denotes a region through which a wireless power signal transferring power to the wireless power receiver 200 is passed. Next, a semi-active area denotes an interest region in which the wireless power transmitter 100 can detect the existence of the wireless power receiver 200. Here, the power transmission control unit 112 may detect whether the wireless power receiver 200 is placed in the active area or detection area or removed from the area. Specifically, the power transmission control unit 112 may detect whether or not the wireless power receiver 200 is placed in the active area or detection area using a wireless power signal formed from the power conversion unit 111 or a sensor separately provided therein. For instance, the power transmission control unit 112 may detect the presence of the wireless power receiver 200 by monitoring whether or not the characteristic of power for forming the wireless power signal is changed by the wireless power signal, which is affected by the wireless power receiver 200 existing in the detection area. However, the active area and detection area may vary according to the wireless power transfer method such as an inductive coupling method, a resonance coupling method, and the like.

The power transmission control unit 112 may perform the process of identifying the wireless power receiver 200 or determine whether to start wireless power transfer according to a result of detecting the existence of the wireless power receiver 200.

Furthermore, the power transmission control unit 112 may determine at least one characteristic of a frequency, a voltage, and a current of the power conversion unit 111 for forming the wireless power signal. The determination of the characteristic may be carried out by a condition at the side of the wireless power transmitter 100 or a condition at the side of the wireless power receiver 200.

The power transmission control unit 112 may receive a power control message from the wireless power receiver 200. The power transmission control unit 112 may determine at least one characteristic of a frequency, a voltage and a current of the power conversion unit 111 based on the received power control message, and additionally perform other control operations based on the power control message.

For example, the power transmission control unit 112 may determine at least one characteristic of a frequency, a voltage and a current used to form the wireless power signal according to the power control message including at least one of rectified power amount information, charging state information and identification information in the wireless power receiver 200.

Furthermore, as another control operation using the power control message, the wireless power transmitter 100 may perform a typical control operation associated with wireless power transfer based on the power control message. For example, the wireless power transmitter 100 may receive information associated with the wireless power receiver 200 to be auditorily or visually outputted through the power control message, or receive information required for authentication between devices.

In exemplary embodiments, the power transmission control unit 112 may receive the power control message through the wireless power signal. In other exemplary embodiment, the power transmission control unit 112 may receive the power control message through a method for receiving user data.

In order to receive the foregoing power control message, the wireless power transmitter 100 may further include a modulation/demodulation unit 113 electrically connected to the power conversion unit 111. The modulation/demodulation unit 113 may modulate a wireless power signal that has been modulated by the wireless power receiver 200 and use it to receive the power control message.

In addition, the power transmission control unit 112 may acquire a power control message by receiving user data including a power control message by a communication means (not shown) included in the wireless power transmitter 100.

Under a wireless power transfer environment allowing for bi-directional communications according to the exemplary embodiments disclosed herein, the power transmission control unit 112 may transmit data to the wireless power receiver 200. The data transmitted by the power transmission control unit 112 may be transmitted to request the wireless power receiver 200 to send the power control message.

Referring to FIG. 2B, the wireless power receiver 200 may include a power supply unit 290. The power supply unit 290 supplies power required for the operation of the wireless power receiver 200. The power supply unit 290 may include a power receiving unit 291 and a power reception control unit 292.

The power receiving unit 291 receives power transferred from the wireless power transmitter 100 in a wireless manner.

The power receiving unit 291 may include constituent elements required to receive the wireless power signal according to a wireless power transfer method. Furthermore, the power receiving unit 291 may receive power according to at least one wireless power transfer method, and in this case, the power receiving unit 291 may include constituent elements required for each method.

First, the power receiving unit 291 may include a coil for receiving a wireless power signal transferred in the form of a magnetic field or electromagnetic field having an oscillation characteristic.

For instance, as a constituent element according to the inductive coupling method, the power receiving unit 291 may include a secondary coil to which a current is induced by a changing magnetic field. In exemplary embodiments, the power receiving unit 291, as a constituent element according to the resonance coupling method, may include a coil and a resonant circuit in which resonance phenomenon is generated by a magnetic field having a specific resonant frequency.

In another exemplary embodiments, when the power receiving unit 291 receives power according to at least one wireless power transfer method, the power receiving unit 291 may be implemented to receive power by using a coil, or implemented to receive power by using a coil formed differently according to each power transfer method.

Among the constituent elements included in the power receiving unit 291, those for the inductive coupling method will be described later with reference to FIGS. 4A and 4B, and those for the resonance coupling method with reference to FIGS. 7A and 7B.

On the other hand, the power receiving unit 291 may further include a rectifier and a regulator to convert the wireless power signal into a direct current. Furthermore, the power receiving unit 291 may further include a circuit for protecting an overvoltage or overcurrent from being generated by the received power signal.

The power reception control unit 292 may control each constituent element included in the power supply unit 290.

Specifically, the power reception control unit 292 may transfer a power control message to the wireless power transmitter 100. The power control message may instruct the wireless power transmitter 100 to initiate or terminate a transfer of the wireless power signal. Furthermore, the power control message may instruct the wireless power transmitter 100 to control a characteristic of the wireless power signal.

In exemplary embodiments, the power reception control unit 292 may transmit the power control message through at least one of the wireless power signal and user data.

In order to transmit the foregoing power control message, the wireless power receiver 200 may further include a modulation/demodulation unit 293 electrically connected to the power receiving unit 291. The modulation/demodulation unit 293, similarly to the case of the wireless power transmitter 100, may be used to transmit the power control message through the wireless power signal. The power communications modulation/demodulation unit 293 may be used as a means for controlling a current and/or voltage flowing through the power conversion unit 111 of the wireless power transmitter 100. Hereinafter, a method for allowing the power communications modulation/demodulation unit 113 or 293 at the side of the wireless power transmitter 100 and at the side of the wireless power receiver 200, respectively, to be used to transmit and receive a power control message through a wireless power signal will be described.

A wireless power signal formed by the power conversion unit 111 is received by the power receiving unit 291. At this time, the power reception control unit 292 controls the power communications modulation/demodulation unit 293 at the side of the wireless power receiver 200 to modulate the wireless power signal. For instance, the power reception control unit 292 may perform a modulation process such that a power amount received from the wireless power signal is varied by changing a reactance of the power communications modulation/demodulation unit 293 connected to the power receiving unit 291. The change of a power amount received from the wireless power signal results in the change of a current and/or voltage of the power conversion unit 111 for forming the wireless power signal. At this time, the modulation/demodulation unit 113 at the side of the wireless power transmitter 100 may detect a change of the current and/or voltage to perform a demodulation process.

In other words, the power reception control unit 292 may generate a packet including a power control message intended to be transferred to the wireless power transmitter 100 and modulate the wireless power signal to allow the packet to be included therein, and the power transmission control unit 112 may decode the packet based on a result of performing the demodulation process of the power communications modulation/demodulation unit 113 to acquire the power control message included in the packet.

In addition, the power reception control unit 292 may transmit a power control message to the wireless power transmitter 100 by transmitting user data including the power control message by a communication means (not shown) included in the wireless power receiver 200.

Under a wireless power transfer environment allowing for bi-directional communications according to the exemplary embodiments disclosed herein, the power reception control unit 292 may receive data to the wireless power transmitter 100. The data transmitted by the wireless power transmitter 100 may be transmitted to request the wireless power receiver 200 to send the power control message.

In addition, the power supply unit 290 may further include a charger 298 and a battery 299.

The wireless power receiver 200 receiving power for operation from the power supply unit 290 may be operated by power transferred from the wireless power transmitter 100, or operated by charging the battery 299 using the transferred power and then receiving the charged power. At this time, the power reception control unit 292 may control the charger 298 to perform charging using the transferred power.

Hereinafter, description will be given of a wireless power transmitter and a wireless power receiver applicable to the exemplary embodiments disclosed herein. First, a method of allowing the wireless power transmitter to transfer power to the electronic device according to the inductive coupling method will be described with reference to FIGS. 3 through 5.

Figure 3:
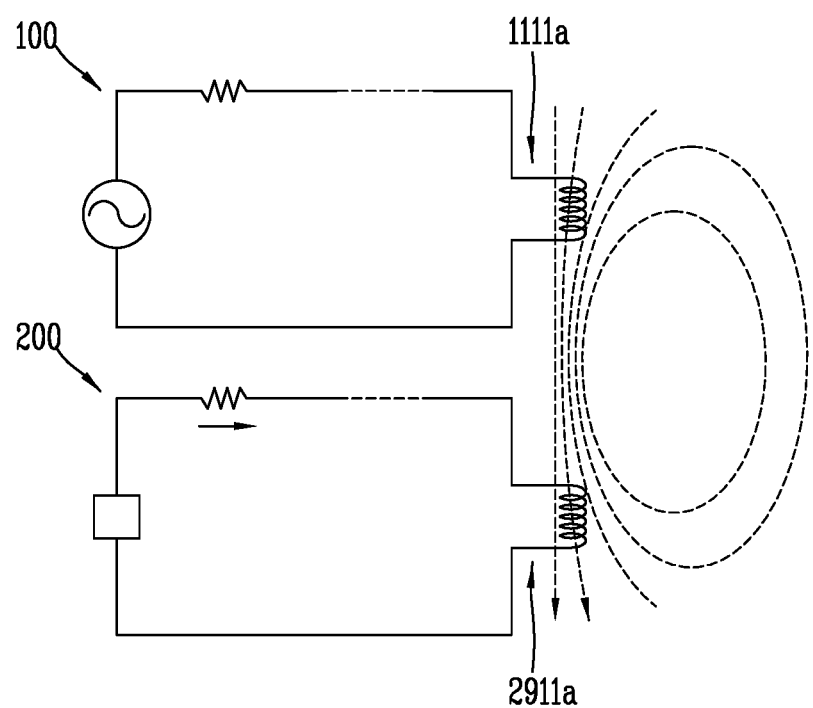
FIG. 3 is a view illustrating a concept in which power is transferred from a wireless power transmitter to a wireless power receiver in a wireless manner according to an inductive coupling method.

FIG. 3 is a view illustrating a concept in which power is transferred from a wireless power transmitter to a wireless power receiver in a wireless manner according to an inductive coupling method.

When the power of the wireless power transmitter 100 is transferred in an inductive coupling method, if the strength of a current flowing through a primary coil within the power transmission unit 110 is changed, then a magnetic field passing through the primary coil will be changed by the current. The changed magnetic field generates an induced electromotive force at a secondary coil in the wireless power receiver 200.

According to the foregoing method, the power conversion unit 111 of the wireless power transmitter 100 may include a transmitting (Tx) coil 1111a being operated as a primary coil in magnetic induction. Furthermore, the power receiving unit 291 of the wireless power receiver 200 may include a receiving (Rx) coil 2911a being operated as a secondary coil in magnetic induction.

First, the wireless power transmitter 100 and wireless power receiver 200 are disposed in such a manner that the transmitting coil 1111a at the side of the wireless power transmitter 100 and the receiving coil at the side of the wireless power receiver 200 are located adjacent to each other. Then, if the power transmission control unit 112 controls a current of the transmitting coil (Tx coil) 1111a to be changed, then the power receiving unit 291 controls power to be supplied to the wireless power receiver 200 using an electromotive force induced to the receiving coil (Rx coil) 2911a.

The efficiency of wireless power transfer by the inductive coupling method may be little affected by a frequency characteristic, but affected by an alignment and distance between the wireless power transmitter 100 and the wireless power receiver 200 including each coil.

On the other hand, in order to perform wireless power transfer in the inductive coupling method, the wireless power transmitter 100 may be configured to include an interface surface (not shown) in the form of a flat surface. One or more electronic devices may be placed at an upper portion of the interface surface, and the transmitting coil 1111a may be mounted at a lower portion of the interface surface. In this case, a vertical spacing is formed in a small-scale between the transmitting coil 1111a mounted at a lower portion of the interface surface and the receiving coil 2911a of the wireless power receiver 200 placed at an upper portion of the interface surface, and thus a distance between the coils becomes sufficiently small to efficiently implement contactless power transfer by the inductive coupling method.

Furthermore, an alignment indicator (not shown) indicating a location where the wireless power receiver 200 is to be placed at an upper portion of the interface surface. The alignment indicator indicates a location of the wireless power receiver 200 where an alignment between the transmitting coil 1111a mounted at a lower portion of the interface surface and the receiving coil 2911a can be suitably implemented. The alignment indicator may alternatively be simple marks, or may be formed in the form of a protrusion structure for guiding the location of the wireless power receiver 200. Otherwise, the alignment indicator may be formed in the form of a magnetic body such as a magnet mounted at a lower portion of the interface surface, thereby guiding the coils to be suitably arranged by mutual magnetism to a magnetic body having an opposite polarity mounted within the wireless power receiver 200.

On the other hand, the wireless power transmitter 100 may be formed to include one or more transmitting coils. The wireless power transmitter 100 may selectively use some of coils suitably arranged with the receiving coil 2911a of the wireless power receiver 200 among the one or more transmitting coils to enhance the power transmission efficiency. The wireless power transmitter 100 including the one or more transmitting coils will be described later with reference to FIG. 5.

Hereinafter, configurations of the wireless power transmitter and wireless power receiver using an inductive coupling method applicable to the embodiments disclosed herein will be described in detail.

Figure 4A:
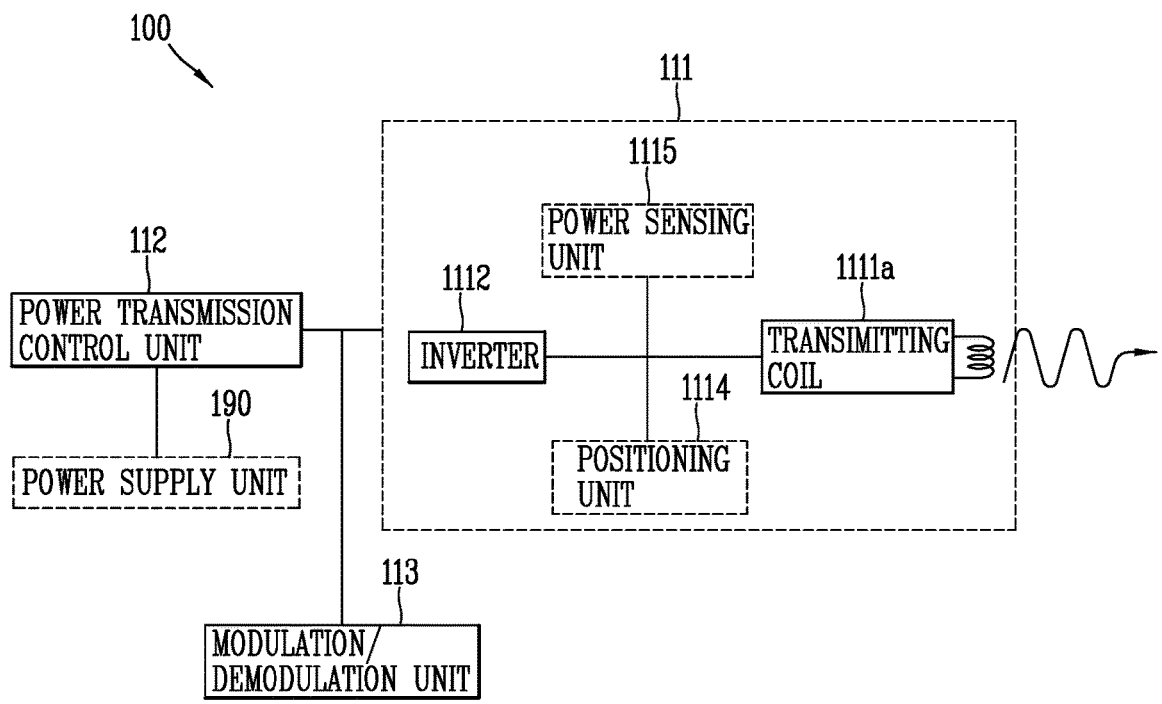
FIGS. 4A and 4B are block diagrams illustrating part of the wireless power transmitter and wireless power receiver in a magnetic induction method that can be employed in the embodiments disclosed herein.
Figure 4B:
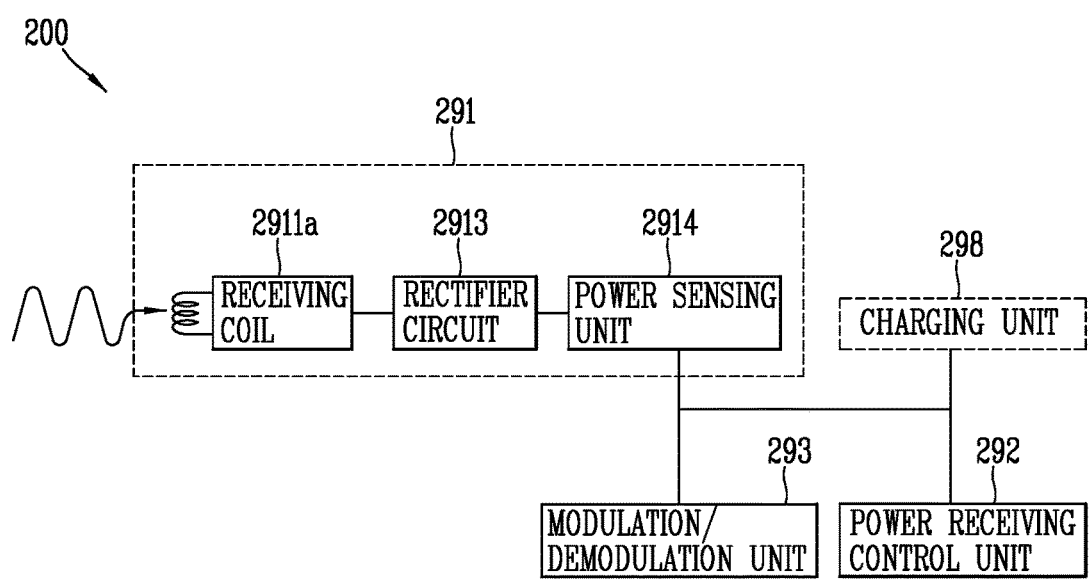

FIGS. 4A and 4B are block diagrams illustrating part of the wireless power transmitter 100 and wireless power receiver 200 in a magnetic induction method that can be employed in the embodiments disclosed herein. A configuration of the power transmission unit 110 included in the wireless power transmitter 100 will be described with reference to FIG. 4A, and a configuration of the power supply unit 290 included in the wireless power receiver 200 will be described with reference to FIG. 4B.

Referring to FIG. 4A, the power conversion unit 111 of the wireless power transmitter 100 may include a transmitting (Tx) coil 1111a and an inverter 1112.

The transmitting coil 1111a may form a magnetic field corresponding to the wireless power signal according to a change of current as described above. The transmitting coil 1111a may alternatively be implemented with a planar spiral type or cylindrical solenoid type.

The inverter 1112 transforms a DC input obtained from the power supply unit 190 into an AC waveform. The AC current transformed by the inverter 1112 drives a resonant circuit including the transmitting coil 1111*a* and a capacitor (not shown) to form a magnetic field in the transmitting coil 1111*a*.

In addition, the power conversion unit 111 may further include a positioning unit 1114.

The positioning unit 1114 may move or rotate the transmitting coil 1111*a* to enhance the effectiveness of contactless power transfer using the inductive coupling method. As described above, it is because an alignment and distance between the wireless power transmitter 100 and the wireless power receiver 200 including a primary coil and a secondary coil may affect power transfer using the inductive coupling method. In particular, the positioning unit 1114 may be used when the wireless power receiver 200 does not exist within an active area of the wireless power transmitter 100.

Accordingly, the positioning unit 1114 may include a drive unit (not shown) for moving the transmitting coil 1111*a* such that a center-to-center distance of the transmitting coil 1111*a* of the wireless power transmitter 100 and the receiving coil 2911*a* of the wireless power receiver 200 is within a predetermined range, or rotating the transmitting coil 1111*a* such that the centers of the transmitting coil 1111*a* and the receiving coil 2911*a* are overlapped with each other.

For this purpose, the wireless power transmitter 100 may further include a detection unit (not shown) made of a sensor for detecting the location of the wireless power receiver 200, and the power transmission control unit 112 may control the positioning unit 1114 based on the location information of the wireless power receiver 200 received from the location detection sensor.

Furthermore, to this end, the power transmission control unit 112 may receive control information on an alignment or distance to the wireless power receiver 200 through the power communications modulation/demodulation unit 113, and control the positioning unit 1114 based on the received control information on the alignment or distance.

If the power conversion unit 111 is configured to include a plurality of transmitting coils, then the positioning unit 1114 may determine which one of the plurality of transmitting coils is to be used for power transmission. The configuration of the wireless power transmitter 100 including the plurality of transmitting coils will be described later with reference to FIG. 5.

On the other hand, the power conversion unit 111 may further include a power sensing unit 1115. The power sensing unit 1115 at the side of the wireless power transmitter 100 monitors a current or voltage flowing into the transmitting coil 1111*a*. The power sensing unit 1115 is provided to check whether or not the wireless power transmitter 100 is normally operated, and thus the power sensing unit 1115 may detect a voltage or current of the power supplied from the outside, and check whether the detected voltage or current exceeds a threshold value. The power sensing unit 1115, although not shown, may include a resistor for detecting a voltage or current of the power supplied from the outside and a comparator for comparing a voltage value or current value of the detected power with a threshold value to output the comparison result. Based on the check result of the power sensing unit 1115, the power transmission control unit 112 may control a switching unit (not shown) to cut off power applied to the transmitting coil 1111*a*.

Referring to FIG. 4B, the power supply unit 290 of the wireless power receiver 200 may include a receiving (Rx) coil 2911*a* and a rectifier 2913. A current is induced into the receiving coil 2911*a* by a change of the magnetic field formed in the transmitting coil 1111*a*. The implementation type of the receiving coil 2911*a* may be a planar spiral type or cylindrical solenoid type similarly to the transmitting coil 1111*a*.

Furthermore, series and parallel capacitors may be configured to be connected to the receiving coil 2911*a* to enhance the effectiveness of wireless power reception or perform resonant detection.

The receiving coil 2911*a* may be in the form of a single coil or a plurality of coils.

The rectifier 2913 performs a full-wave rectification to a current to convert alternating current into direct current. The rectifier 2913, for instance, may be implemented with a full-bridge rectifier made of four diodes or a circuit using active components.

In addition, the rectifier 2913 may further include a regulator for converting a rectified current into a more flat and stable direct current.

Furthermore, the output power of the rectifier 2913 is supplied to each constituent element of the power supply unit 290. Furthermore, the rectifier 2913 may further include a DC-DC converter for converting output DC power into a suitable voltage to adjust it to the power required for each constituent element (for instance, a circuit such as a charger 298).

The power communications modulation/demodulation unit 293 may be connected to the power receiving unit 291, and may be configured with a resistive element in which resistance varies with respect to direct current, and may be configured with a capacitive element in which reactance varies with respect to alternating current. The power reception control unit 292 may change the resistance or reactance of the power communications modulation/demodulation unit 293 to modulate a wireless power signal received to the power receiving unit 291.

On the other hand, the power supply unit 290 may further include a power sensing unit 2914. The power sensing unit 2914 at the side of the wireless power receiver 200 monitors a voltage and/or current of the power rectified by the rectifier 2913, and if the voltage and/or current of the rectified power exceeds a threshold value as a result of monitoring, then the power reception control unit 292 transmits a power control message to the wireless power transmitter 100 to transfer suitable power.

Figure 5:
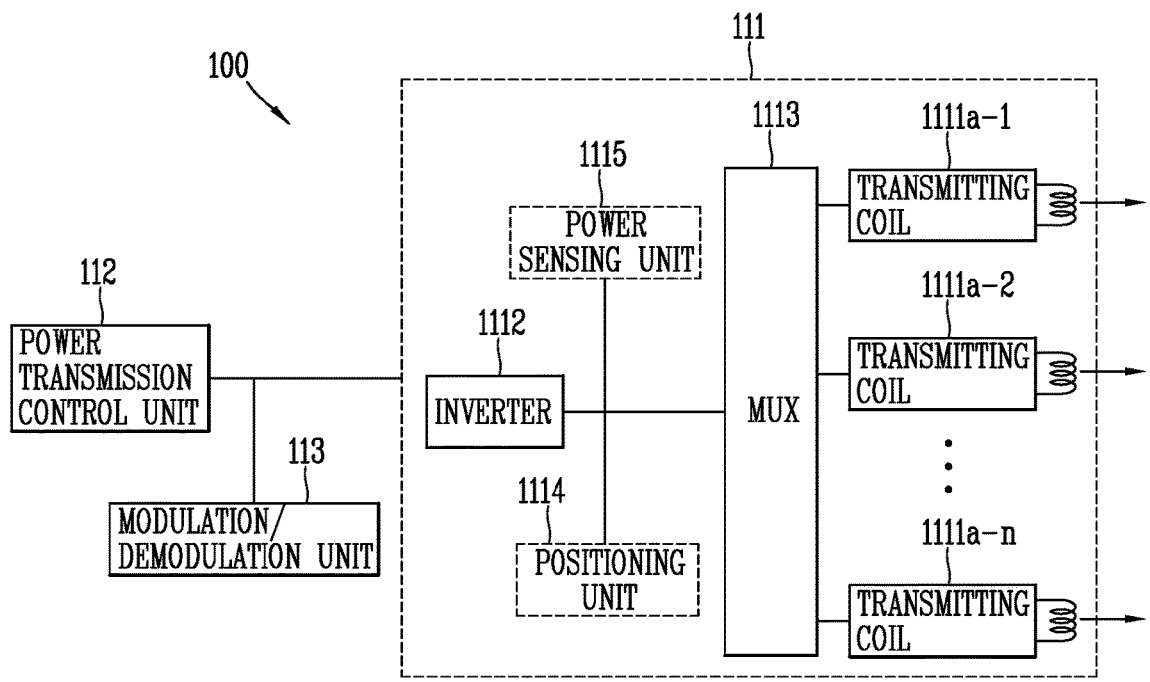
FIG. 5 is a block diagram illustrating a wireless power transmitter configured to have one or more transmitting coils receiving power according to an inductive coupling method that can be employed in the embodiments disclosed herein.

FIG. 5 is a block diagram illustrating a wireless power transmitter configured to have one or more transmission coils receiving power according to an inductive coupling method that can be employed in the embodiments disclosed herein.

Referring to FIG. 5, the power conversion unit 111 of the wireless power transmitter 100 according to the embodiments disclosed herein may include one or more transmitting coils 1111*a*-1 to 1111*a*-*n*. The one or more transmitting coils 1111*a*-1 to 1111*a*-*n* may be an array of partly overlapping primary coils. An active area may be determined by some of the one or more transmitting coils.

The one or more transmitting coils 1111*a*-1 to 1111*a*-*n* may be mounted at a lower portion of the interface surface. Furthermore, the power conversion unit 111 may further include a multiplexer 1113 for establishing and releasing the connection of some of the one or more transmitting coils 1111*a*-1 to 1111*a*-*n*.

Upon detecting the location of the wireless power receiver 200 placed at an upper portion of the interface surface, the power transmission control unit 112 may take the detected location of the wireless power receiver 200 into consideration to control the multiplexer 1113, thereby allowing coils that can be placed in an inductive coupling relation to the receiving coil 2911a of the wireless power receiver 200 among the one or more transmitting coils 1111a-1 to 1111a-n to be connected to one another.

For this purpose, the power transmission control unit 112 may acquire the location information of the wireless power receiver 200. For example, the power transmission control unit 112 may acquire the location of the wireless power receiver 200 on the interface surface by the location detection unit (not shown) provided in the wireless power transmitter 100. For another example, the power transmission control unit 112 may alternatively receive a power control message indicating a strength of the wireless power signal from an object on the interface surface or a power control message indicating the identification information of the object using the one or more transmitting coils 1111a-1 to 1111a-n, respectively, and determines whether it is located adjacent to which one of the one or more transmitting coils based on the received result, thereby acquiring the location information of the wireless power receiver 200.

On the other hand, the active area as part of the interface surface may denote a portion through which a magnetic field with a high efficiency can pass when the wireless power transmitter 100 transfers power to the wireless power receiver 200 in a wireless manner. At this time, a single transmitting coil or one or a combination of more transmitting coils forming a magnetic field passing through the active area may be designated as a primary cell. Accordingly, the power transmission control unit 112 may determine an active area based on the detected location of the wireless power receiver 200, and establish the connection of a primary cell corresponding to the active area to control the multiplexer 1113, thereby allowing the receiving coil 2911a of the wireless power receiver 200 and the coils belonging to the primary cell to be placed in an inductive coupling relation.

Furthermore, the power conversion unit 111 may further include an impedance matching unit (not shown) for controlling an impedance to form a resonant circuit with the coils connected thereto.

Hereinafter, a method for allowing a wireless power transmitter to transfer power according to a resonance coupling method will be disclosed with reference to FIGS. 6 through 8.

Resonance Coupling Method

Figure 6:
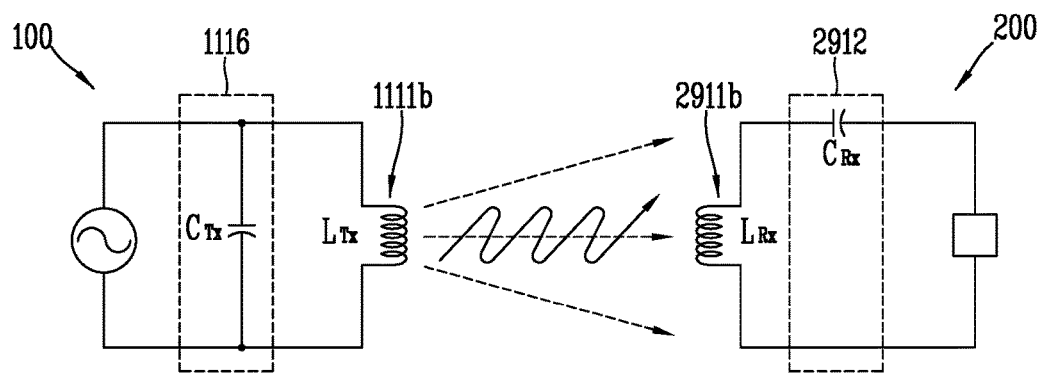
FIG. 6 is a view illustrating a concept in which power is transferred to a wireless power receiver from a wireless power transmitter in a wireless manner according to a resonance coupling method.

FIG. 6 is a view illustrating a concept in which power is transferred to a wireless power receiver from a wireless power transmitter in a wireless manner according to a resonance coupling method.

First, resonance will be described in brief as follows. Resonance refers to a phenomenon in which amplitude of vibration is remarkably increased when periodically receiving an external force having the same frequency as the natural frequency of a vibration system. Resonance is a phenomenon occurring at all kinds of vibrations such as mechanical vibration, electric vibration, and the like. Generally, when exerting a vibratory force to a vibration system from the outside, if the natural frequency thereof is the same as a frequency of the externally applied force, then the vibration becomes strong, thus increasing the width.

With the same principle, when a plurality of vibrating bodies separated from one another within a predetermined distance vibrate at the same frequency, the plurality of vibrating bodies resonate with one another, and in this case, resulting in a reduced resistance between the plurality of vibrating bodies. In an electrical circuit, a resonant circuit can be made by using an inductor and a capacitor.

When the wireless power transmitter 100 transfers power according to the inductive coupling method, a magnetic field having a specific vibration frequency is formed by alternating current power in the power transmission unit 110. If a resonance phenomenon occurs in the wireless power receiver 200 by the formed magnetic field, then power is generated by the resonance phenomenon in the wireless power receiver 200.

The resonant frequency may be determined by the following formula in Equation 1.

$$f = \frac{1}{2\pi\sqrt{LC}}$$ [Equation 1]

Here, the resonant frequency (f) is determined by an inductance (L) and a capacitance (C) in a circuit. In a circuit forming a magnetic field using a coil, the inductance can be determined by a number of turns of the coil, and the like, and the capacitance can be determined by a gap between the coils, an area, and the like. In addition to the coil, a capacitive resonant circuit may be configured to be connected thereto to determine the resonant frequency.

Referring to FIG. 6, when power is transmitted in a wireless manner according to the resonance coupling method, the power conversion unit 111 of the wireless power transmitter 100 may include a transmitting (Tx) coil 1111b in which a magnetic field is formed and a resonant circuit 1116 connected to the transmitting coil 1111b to determine a specific vibration frequency. The resonant circuit 1116 may be implemented by using a capacitive circuit (capacitors), and the specific vibration frequency may be determined based on an inductance of the transmitting coil 1111b and a capacitance of the resonant circuit 1116.

The configuration of a circuit element of the resonant circuit 1116 may be implemented in various forms such that the power conversion unit 111 forms a magnetic field, and is not limited to a form of being connected in parallel to the transmitting coil 1111b as illustrated in FIG. 6.

Furthermore, the power receiving unit 291 of the wireless power receiver 200 may include a resonant circuit 2912 and a receiving (Rx) coil 2911b to generate a resonance phenomenon by a magnetic field formed in the wireless power transmitter 100. In other words, the resonant circuit 2912 may be also implemented by using a capacitive circuit, and the resonant circuit 2912 is configured such that a resonant frequency determined based on an inductance of the receiving coil 2911b and a capacitance of the resonant circuit 2912 has the same frequency as a resonant frequency of the formed magnetic field.

The configuration of a circuit element of the resonant circuit 2912 may be implemented in various forms such that the power receiving unit 291 generates resonance by a magnetic field, and is not limited to a form of being connected in series to the receiving coil 2911b as illustrated in FIG. 6.

The specific vibration frequency in the wireless power transmitter 100 may have $L_{TX}$, $C_{TX}$, and may be acquired by using the Equation 1. Here, the wireless power receiver 200 generates resonance when a result of substituting the $L_{RX}$ and $C_{RX}$ of the wireless power receiver 200 to the Equation 1 is same as the specific vibration frequency.

As a result, an efficiency of contactless power transfer by the resonance coupling method is greatly affected by a frequency characteristic, whereas the effect of an alignment and distance between the wireless power transmitter 100 and the wireless power receiver 200 including each coil is relatively smaller than the inductive coupling method.

Hereinafter, the configuration of a wireless power transmitter and a wireless power receiver in the resonance coupling method applicable to the embodiments disclosed herein will be described in detail.

Figure 7A:
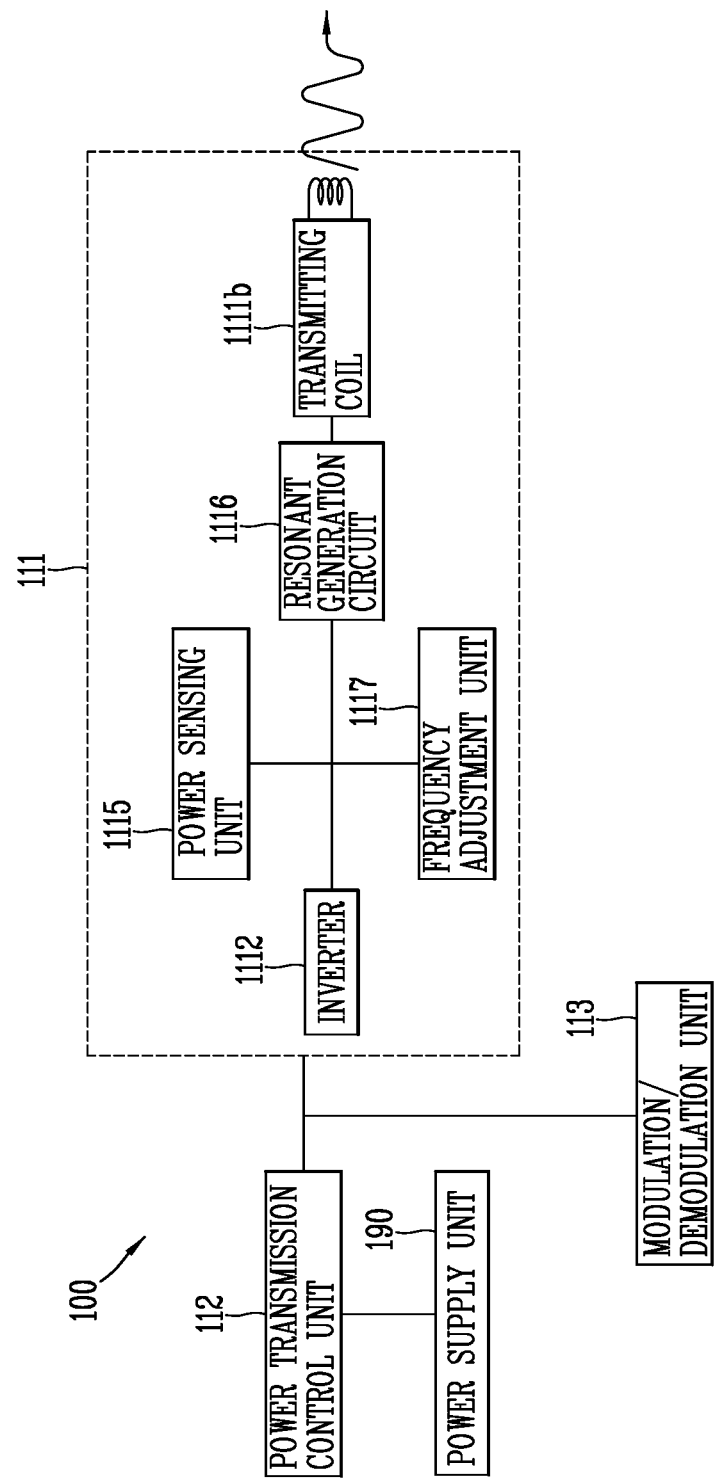
FIGS. 7A and 7B are block diagrams illustrating part of the wireless power transmitter and the wireless power receiver in a resonance method that can be employed in the embodiments disclosed herein.
Figure 7B:
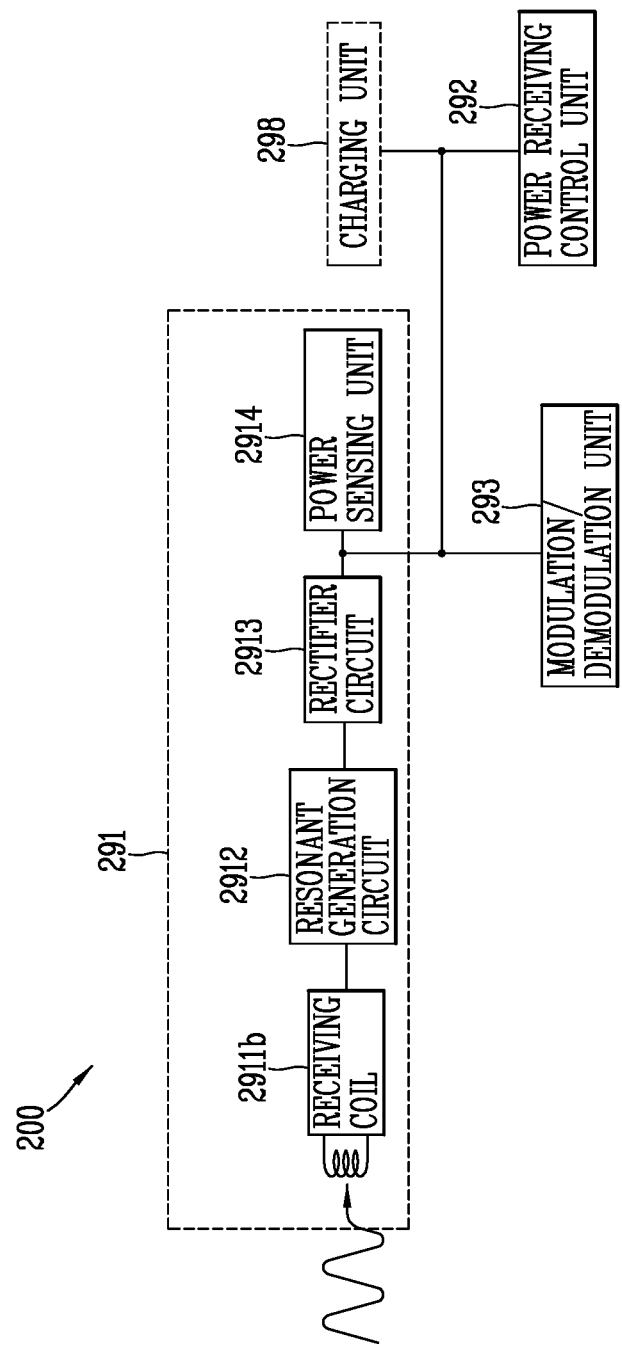

FIGS. 7A and 7B are block diagrams illustrating part of the wireless power transmitter 100 and the wireless power receiver 200 in a resonance method that can be employed in the embodiments disclosed herein.

A configuration of the power transmission unit 110 included in the wireless power transmitter 100 will be described with reference to FIG. 7A.

The power conversion unit 111 of the wireless power transmitter 100 may include a transmitting (Tx) coil 1111b, an inverter 1112, and a resonant circuit 1116. The inverter 1112 may be configured to be connected to the transmitting coil 1111b and the resonant circuit 1116.

The transmitting coil 1111b may be mounted separately from the transmitting coil 1111a for transferring power according to the inductive coupling method, but may transfer power in the inductive coupling method and resonance coupling method using one single coil.

The transmitting coil 1111b, as described above, forms a magnetic field for transferring power. The transmitting coil 1111b and the resonant circuit 1116 generate resonance when alternating current power is applied thereto, and at this time, a vibration frequency may be determined based on an inductance of the transmitting coil 1111b and a capacitance of the resonant circuit 1116.

For this purpose, the inverter 1112 transforms a DC input obtained from the power supply unit 190 into an AC waveform, and the transformed AC current is applied to the transmitting coil 1111b and the resonant circuit 1116.

In addition, the power conversion unit 111 may further include a frequency adjustment unit 1117 for changing a resonant frequency of the power conversion unit 111. The resonant frequency of the power conversion unit 111 is determined based on an inductance and/or capacitance within a circuit constituting the power conversion unit 111 by Equation 1, and thus the power transmission control unit 112 may determine the resonant frequency of the power conversion unit 111 by controlling the frequency adjustment unit 1117 to change the inductance and/or capacitance.

The frequency adjustment unit 1117, for example, may be configured to include a motor for adjusting a distance between capacitors included in the resonant circuit 1116 to change a capacitance, or include a motor for adjusting a number of turns or diameter of the transmitting coil 1111b to change an inductance, or include active elements for determining the capacitance and/or inductance On the other hand, the power conversion unit 111 may further include a power sensing unit 1115. The operation of the power sensing unit 1115 is the same as the foregoing description.

Referring to FIG. 7B, a configuration of the power supply unit 290 included in the wireless power receiver 200 will be described. The power supply unit 290, as described above, may include the receiving (Rx) coil 2911b and resonant circuit 2912.

In addition, the power receiving unit 291 of the power supply unit 290 may further include a rectifier 2913 for converting an AC current generated by resonance phenomenon into DC. The rectifier 2913 may be configured similarly to the foregoing description.

Furthermore, the power receiving unit 291 may further include a power sensing unit 2914 for monitoring a voltage and/or current of the rectified power. The power sensing unit 2914 may be configured similarly to the foregoing description.

Figure 8:
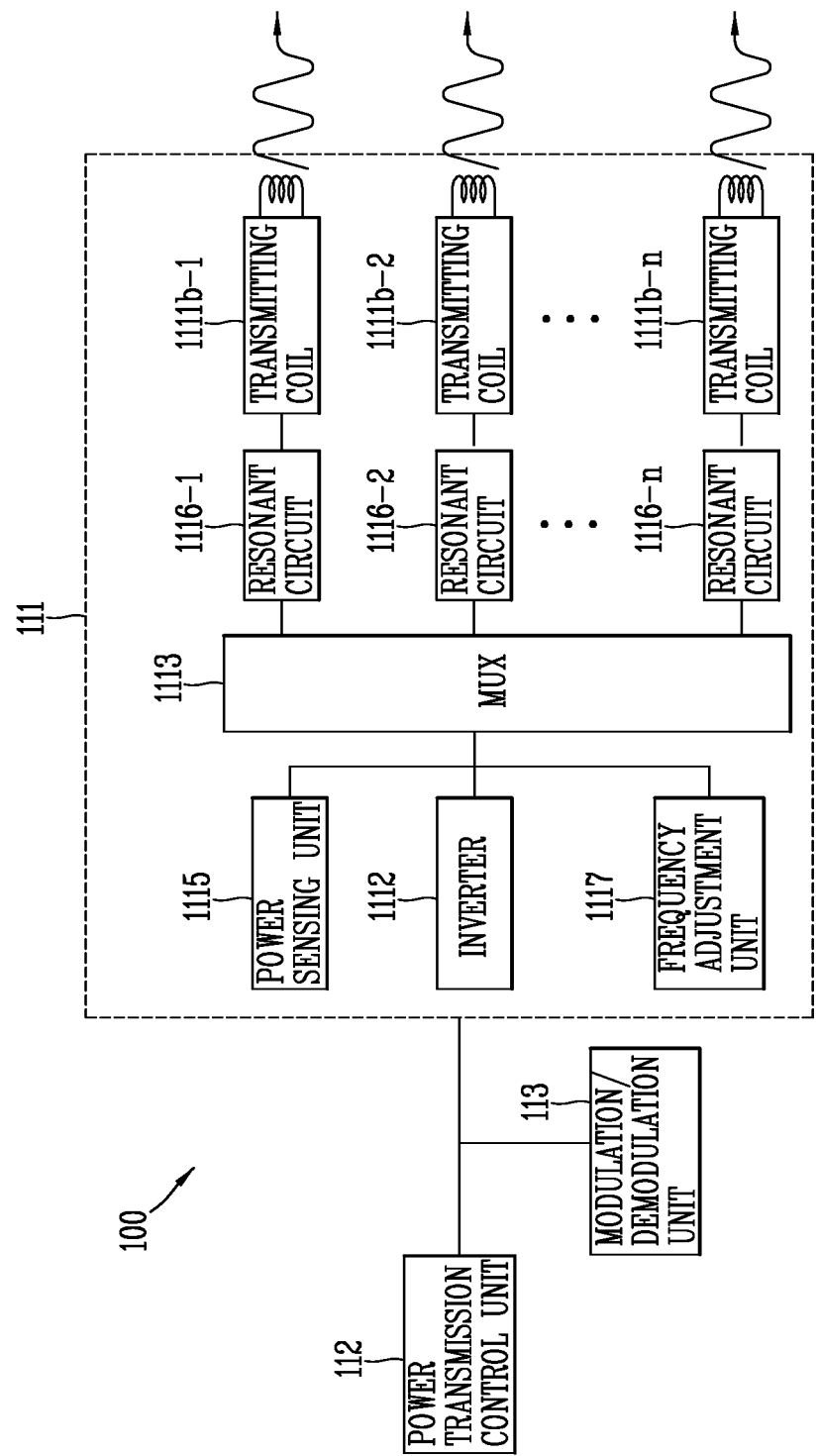
FIG. 8 is a block diagram illustrating a wireless power transmitter configured to have one or more transmitting coils receiving power according to a resonance coupling method that can be employed in the embodiments disclosed herein.

FIG. 8 is a block diagram illustrating a wireless power transmitter configured to have one or more transmission coils receiving power according to a resonance coupling method that can be employed in the embodiments disclosed herein.

Referring to FIG. 8, the power conversion unit 111 of the wireless power transmitter 100 according to the embodiments disclosed herein may include one or more transmitting coils 1111b-1 to 1111b-n and resonant circuits (1116-1 to 1116-n) connected to each transmitting coils. Furthermore, the power conversion unit 111 may further include a multiplexer 1113 for establishing and releasing the connection of some of the one or more transmitting coils 1111b-1 to 1111b-n.

The one or more transmitting coils 1111b-1 to 1111b-n may be configured to have the same vibration frequency, or some of them may be configured to have different vibration frequencies. It is determined by an inductance and/or capacitance of the resonant circuits (1116-1 to 1116-n) connected to the one or more transmitting coils 1111b-1 to 1111b-n, respectively.

For this purpose, the frequency adjustment unit 1117 may be configured to change an inductance and/or capacitance of the resonant circuits (1116-1 to 1116-n) connected to the one or more transmitting coils 1111b-1 to 1111b-n, respectively.

Figure 9:
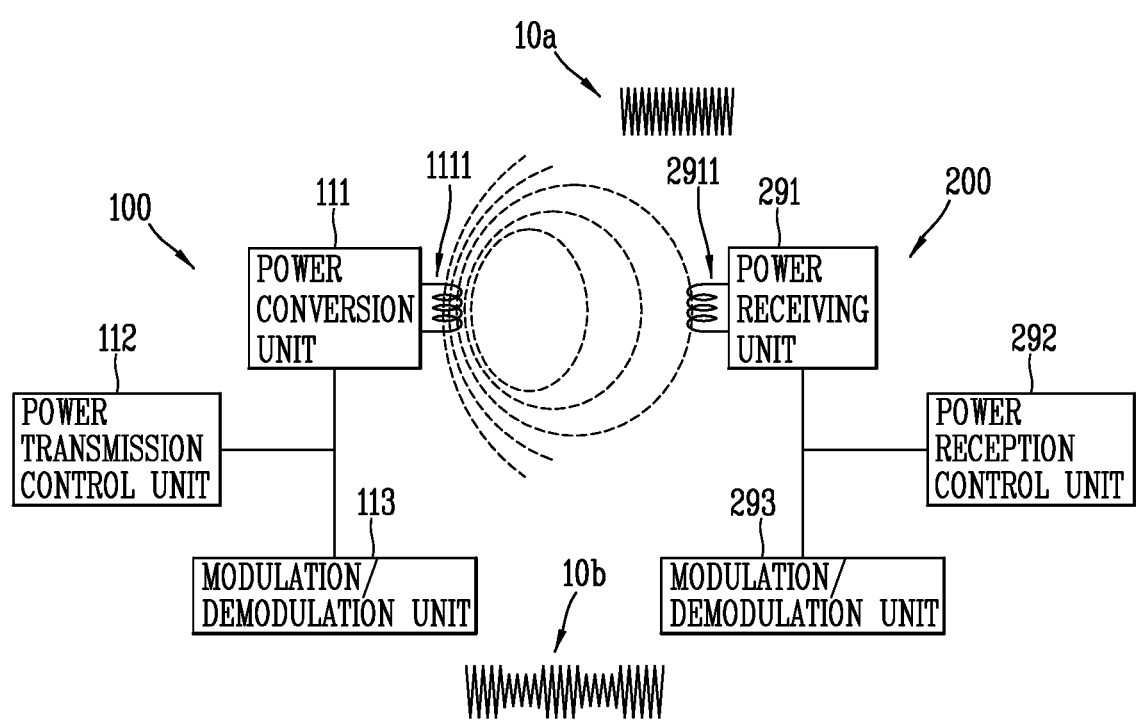
FIG. 9 is a view illustrating a concept of transmitting and receiving a packet between a wireless power transmitter and an electronic device through modulation and demodulation of a wireless power signal in transferring power in a wireless manner disclosed herein.

FIG. 9 a view illustrating the concept of transmitting and receiving a packet between a wireless power transmitter and an electronic device through the modulation and demodulation of a wireless power signal in transferring power in a wireless manner disclosed herein.

As illustrated in FIG. 9, the power conversion unit 111 included in the wireless power transmitter 100 may generate a wireless power signal. The wireless power signal may be generated through the transmitting coil 1111 included in the power conversion unit 111.

The wireless power signal 10a generated by the power conversion unit 111 may arrive at the electronic device 200 so as to be received through the power receiving unit 291 of the electronic device 200. The generated wireless power signal may be received through the receiving coil 2911 included in the power receiving unit 291.

The power reception control unit 292 may control the modulation/demodulation unit 293 connected to the power receiving unit 291 to modulate the wireless power signal while the electronic device 200 receives the wireless power signal. When the received wireless power signal is modulated, the wireless power signal may form a closed-loop within a magnetic field or an electro-magnetic field. This may allow the wireless power transmitter 100 to sense a modulated wireless power signal 10b. The modulation/demodulation unit 113 may demodulate the sensed wireless power signal and decode the packet from the demodulated wireless power signal.

The modulation method employed for the communication between the wireless power transmitter 100 and the electronic device 200 may be an amplitude modulation. As aforementioned, the amplitude modulation is a backscatter modulation may be a backscatter modulation method in which the power communications modulation/demodulation unit 293 at the side of the electronic device 200 changes an amplitude of the wireless power signal 10a formed by the power conversion unit 111 and the power reception control unit 292 at the side of the wireless power transmitter 100 detects an amplitude of the modulated wireless power signal 10b.

Hereinafter, description will be given of modulation and demodulation of a packet, which is transmitted or received between the wireless power transmitter 100 and the electronic device 200 with reference to FIGS. 10, 11A, 11B and 11C.

Figure 10:
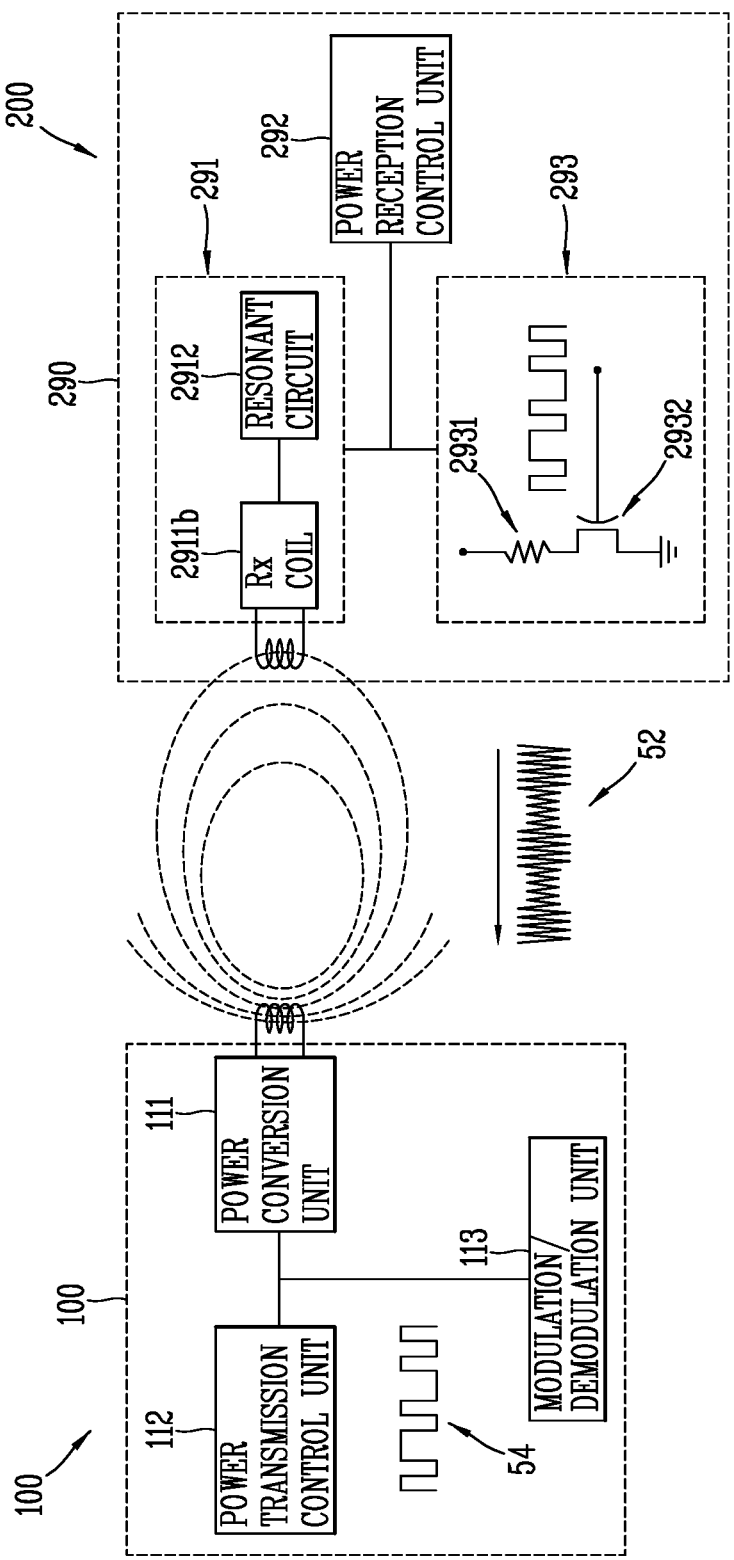
FIG. 10 is a view illustrating a configuration of transmitting and receiving a power control message in transferring power in a wireless manner according to the embodiments disclosed herein.
Figure 11A:
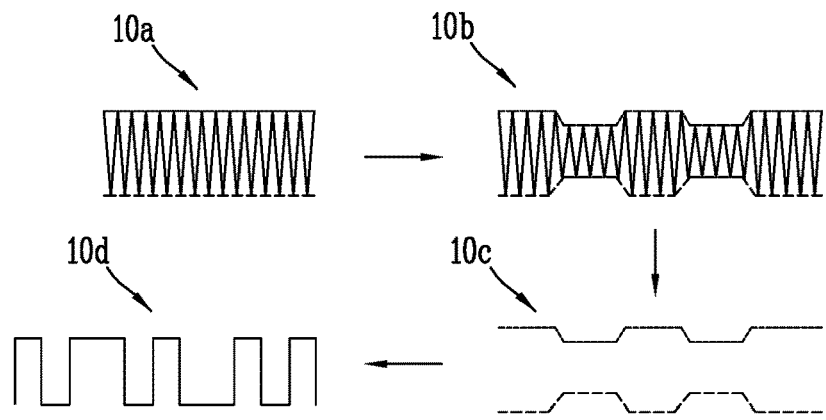
FIGS. 11A, 11B and 11C are views illustrating forms of signals upon modulation and demodulation executed during a wireless power transfer according to the embodiments disclosed herein.
Figure 11B:
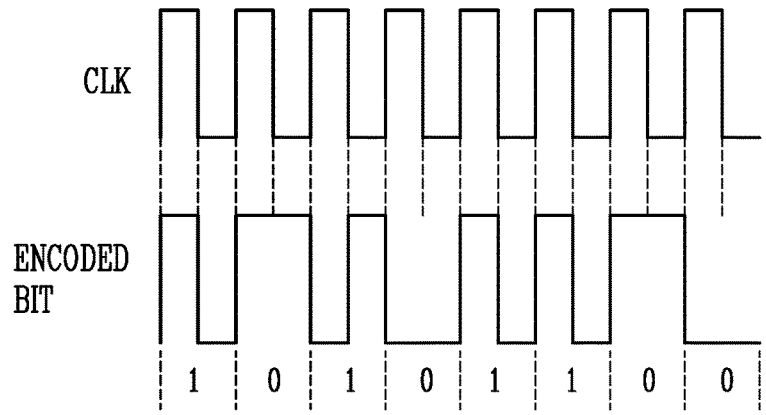
Figure 11C:
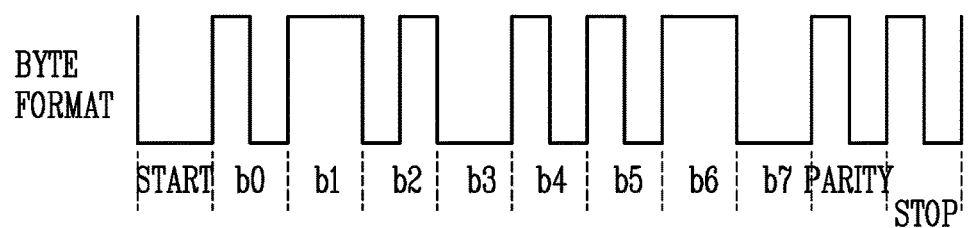

FIG. 10 is a view illustrating a configuration of transmitting or receiving a power control message in transferring power in a wireless manner disclosed herein, and FIGS. 11A, 11B and 11C are views illustrating forms of signals upon modulation and demodulation executed in the wireless power transfer disclosed herein.

Referring to FIG. 10, the wireless power signal received through the power receiving unit 291 of the wireless power receiver 200, as illustrated in FIG. 11A, may be a non-modulated wireless power signal 51. The electronic device 200 and the wireless power transmitter 100 may establish a resonance coupling according to a resonant frequency, which is set by the resonant circuit 2912 within the power receiving unit 291, and the wireless power signal 51 may be received through the receiving coil 2911b.

The power reception control unit 292 may modulate the wireless power signal 51 received through the power receiving unit 291 by changing a load impedance within the modulation/demodulation unit 293. The modulation/demodulation unit 293 may include a passive element 2931 and an active element 2932 for modulating the wireless power signal 51. The modulation/demodulation unit 293 may modulate the wireless power signal 51 to include a packet, which is desired to be transmitted to the wireless power transmitter 100. Here, the packet may be input into the active element 2932 within the modulation/demodulation unit 293.

Afterwards, the power transmission control unit 112 of the wireless power transmitter 100 may demodulate a modulated wireless power signal 52 through an envelop detection, and decode the detected signal 53 into digital data 54. The demodulation may detect a current or voltage flowing into the power conversion unit 111 to be classified into two states, a HI phase and a LO phase, and acquire a packet to be transmitted by the electronic device 200 based on digital data classified according to the states.

Hereinafter, a process of allowing the wireless power transmitter 100 to acquire a power control message to be transmitted by the electronic device 200 from the demodulated digital data will be described.

Referring to FIG. 11B, the power transmission control unit 112 detects an encoded bit using a clock signal (CLK) from an envelope detected signal. The detected encoded bit is encoded according to a bit encoding method used in the modulation process at the side of the electronic device 200. The bit encoding method may correspond to any one of non-return to zero (NRZ) and bi-phase encoding.

For instance, the detected bit may be a differential bi-phase (DBP) encoded bit. According to the DBP encoding, the power reception control unit 292 at the side of the electronic device 200 is allowed to have two state transitions to encode data bit 1, and to have one state transition to encode data bit 0. In other words, data bit 1 may be encoded in such a manner that a transition between the HI state and LO state is generated at a rising edge and falling edge of the clock signal, and data bit 0 may be encoded in such a manner that a transition between the HI state and LO state is generated at a rising edge of the clock signal.

On the other hand, the power transmission control unit 112 may acquire data in a byte unit using a byte format constituting a packet from a bit string detected according to the bit encoding method. For instance, the detected bit string may be transferred by using an 11-bit asynchronous serial format as illustrated in FIG. 12C. In other words, the detected bit may include a start bit indicating the beginning of a byte and a stop bit indicating the end of a byte, and also include data bits (b0 to b7) between the start bit and the stop bit. Furthermore, it may further include a parity bit for checking an error of data. The data in a byte unit constitutes a packet including a power control message.

As aforementioned, FIG. 9 has illustrated that the wireless power receiver 200 transmits a packet using a carrier signal 10a formed by the wireless power transmitter 100. However, the wireless power transmitter 100 may also transmit data to the wireless power receiver 200 by a similar method.

That is, the power transmission control unit 112 may control the modulation/demodulation unit 113 to modulate data, which is to be transmitted to the wireless power receiver 200, such that the data can be included in the carrier signal 10a. Here, the power reception control unit 292 of the wireless power receiver 200 may control the modulation/demodulation unit 293 to execute demodulation so as to acquire data from the modulated carrier signal 10a.

Hereinafter, description will be given of operation phases of the wireless power transmitter 100 and the wireless power receiver 200.

Figure 12:
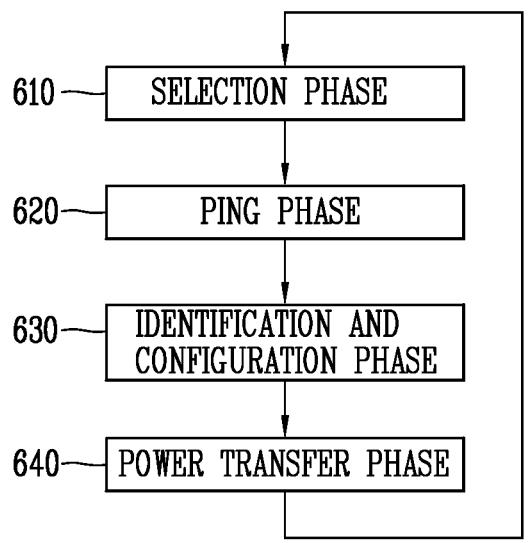
FIG. 12 is a view illustrating operation phases of the wireless power transmitter and the wireless power receiver according to the embodiments disclosed herein.

FIG. 12 illustrates the operation phases of the wireless power transmitter 100 and the wireless power receiver 200 according to the embodiments disclosed herein. Furthermore, FIGS. 14 to 18 illustrate the structures of packets including a power control message between the wireless power transmitter 100 and the wireless power receiver 200.

Referring to FIG. 12, the operation phases of the wireless power transmitter 100 and the wireless power receiver 200 for wireless power transfer may be divided into a selection phase 610, a ping phase 620, an identification and configuration phase 630, and a power transfer phase 640.

The wireless power transmitter 100 detects whether or not objects exist within a range that the wireless power transmitter 100 can transmit power in a wireless manner in the selection phase 610, and the wireless power transmitter 100 sends a detection signal to the detected object and the wireless power receiver 200 sends a response to the detection signal in the ping phase 620.

Furthermore, the wireless power transmitter 100 identifies the wireless power receiver 200 selected through the previous states and acquires configuration information for power transmission in the identification and configuration phase 630. The wireless power transmitter 100 transmits power to the wireless power receiver 200 while controlling power transmitted in response to a control message received from the wireless power receiver 200 in the power transfer phase 640.

Hereinafter, each of the operation phases will be described in detail.

1) Selection Phase

The wireless power transmitter 100 in the selection phase 610 performs a detection process to select the wireless power receiver 200 existing within a detection area. The detection area, as described above, refers to a region in which an object within the relevant area can affect on the characteristic of the power of the power conversion unit 111. Compared to the ping phase 620, the detection process for selecting the wireless power receiver 200 in the selection phase 610 is a process of detecting a change of the power amount for forming a wireless power signal in the power conversion unit at the side of the wireless power transmitter 100 to check whether any object exists within a predetermined range, instead of the scheme of receiving a response from the wireless power receiver 200 using a power control message. The detection process in the selection phase 610 may be referred to as an analog ping process in the aspect of detecting an object using a wireless power signal without using a packet in a digital format in the ping phase 620 which will be described later.

The wireless power transmitter 100 in the selection phase 610 can detect that an object comes in or out within the detection area. Furthermore, the wireless power transmitter 100 can distinguish the wireless power receiver 200 capable of transferring power in a wireless manner from other objects (for example, a key, a coin, etc.) among objects located within the detection area.

As described above, a distance that can transmit power in a wireless manner may be different according to the inductive coupling method and resonance coupling method, and thus the detection area for detecting an object in the selection phase 610 may be different from one another.

First, in case where power is transmitted according to the inductive coupling method, the wireless power transmitter 100 in the selection phase 610 can monitor an interface surface (not shown) to detect the alignment and removal of objects.

Furthermore, the wireless power transmitter 100 may detect the location of the wireless power receiver 200 placed on an upper portion of the interface surface. As described above, the wireless power transmitter 100 formed to include one or more transmitting coils may perform the process of entering the ping phase 620 in the selection phase 610, and checking whether or not a response to the detection signal is transmitted from the object using each coil in the ping phase 620 or subsequently entering the identification state 630 to check whether identification information is transmitted from the object. The wireless power transmitter 100 may determine a coil to be used for contactless power transfer based on the detected location of the wireless power receiver 200 acquired through the foregoing process.

Furthermore, when power is transmitted according to the resonance coupling method, the wireless power transmitter 100 in the selection phase 610 can detect an object by detecting that any one of a frequency, a current and a voltage of the power conversion unit is changed due to an object located within the detection area.

On the other hand, the wireless power transmitter 100 in the selection phase 610 may detect an object by at least any one of the detection methods using the inductive coupling method and resonance coupling method. The wireless power transmitter 100 may perform an object detection process according to each power transmission method, and subsequently select a method of detecting the object from the coupling methods for contactless power transfer to advance to other states 620, 630, 640.

On the other hand, for the wireless power transmitter 100, a wireless power signal formed to detect an object in the selection phase 610 and a wireless power signal formed to perform digital detection, identification, configuration and power transmission in the subsequent states 620, 630, 640 may have a different characteristic in the frequency, strength, and the like. It is because the selection phase 610 of the wireless power transmitter 100 corresponds to an idle state for detecting an object, thereby allowing the wireless power transmitter 100 to reduce consumption power in the idle state or generate a specialized signal for effectively detecting an object.

2) Ping Phase

The wireless power transmitter 100 in the ping phase 620 performs a process of detecting the wireless power receiver 200 existing within the detection area through a power control message. Compared to the detection process of the wireless power receiver 200 using a characteristic of the wireless power signal and the like in the selection phase 610, the detection process in the ping phase 620 may be referred to as a digital ping process.

The wireless power transmitter 100 in the ping phase 620 forms a wireless power signal to detect the wireless power receiver 200, modulates the wireless power signal modulated by the wireless power receiver 200, and acquires a power control message in a digital data format corresponding to a response to the detection signal from the modulated wireless power signal. The wireless power transmitter 100 may receive a power control message corresponding to the response to the detection signal to recognize the wireless power receiver 200 which is a subject of power transmission.

The detection signal formed to allowing the wireless power transmitter 100 in the ping phase 620 to perform a digital detection process may be a wireless power signal formed by applying a power signal at a specific operating point for a predetermined period of time. The operating point may denote a frequency, duty cycle, and amplitude of the voltage applied to the transmitting (Tx) coil. The wireless power transmitter 100 may generate the detection signal generated by applying the power signal at a specific operating point for a predetermined period of time, and attempt to receive a power control message from the wireless power receiver 200.

Figure 14:
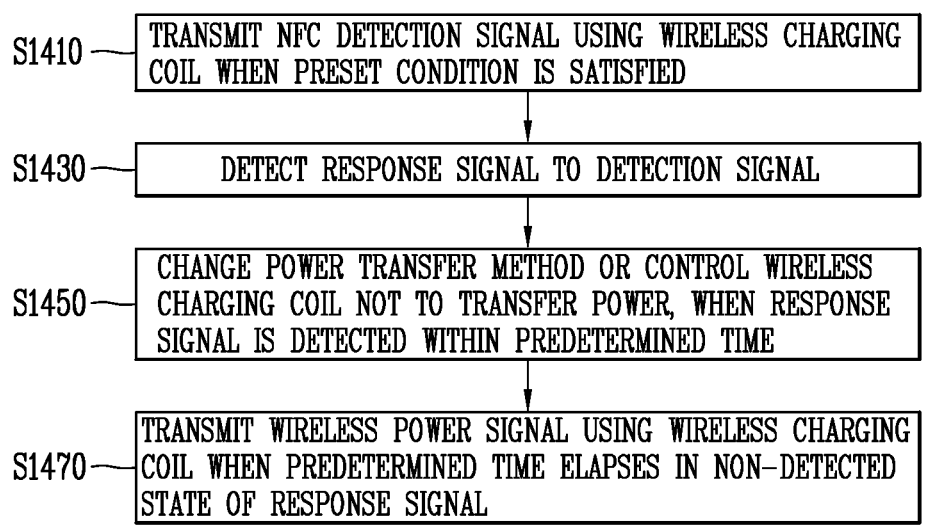
FIG. 14 is a flowchart illustrating a wireless power transfer method of a wireless power transmitter in accordance with one embodiment disclosed herein.

On the other hand, the power control message corresponding to a response to the detection signal may be a message indicating strength of the wireless power signal received by the wireless power receiver 200. For example, the wireless power receiver 200 may transmit a signal strength packet 5100 including a message indicating the received strength of the wireless power signal as a response to the detection signal as illustrated in FIG. 14. The packet 5100 may include a header 5120 for notifying a packet indicating the signal strength and a message 5130 indicating strength of the power signal received by the wireless power receiver 200. The strength of the power signal within the message 5130 may be a value indicating a degree of inductive coupling or resonance coupling for power transmission between the wireless power transmitter 100 and the wireless power receiver 200.

The wireless power transmitter 100 may receive a response message to the detection signal to find the wireless power receiver 200, and then extend the digital detection process to enter the identification and configuration phase 630. In other words, the wireless power transmitter 100 maintains the power signal at a specific operating point subsequent to finding the wireless power receiver 200 to receive a power control message required in the identification and configuration phase 630.

However, if the wireless power transmitter 100 is not able to find the wireless power receiver 200 to which power can be transferred, then the operation phase of the wireless power transmitter 100 will be returned to the selection phase 610.

3) Identification and Configuration Phase

The wireless power transmitter 100 in the identification and configuration phase 630 may receive identification information and/or configuration information transmitted by the wireless power receiver 200, thereby controlling power transmission to be effectively carried out.

Figure 15A:
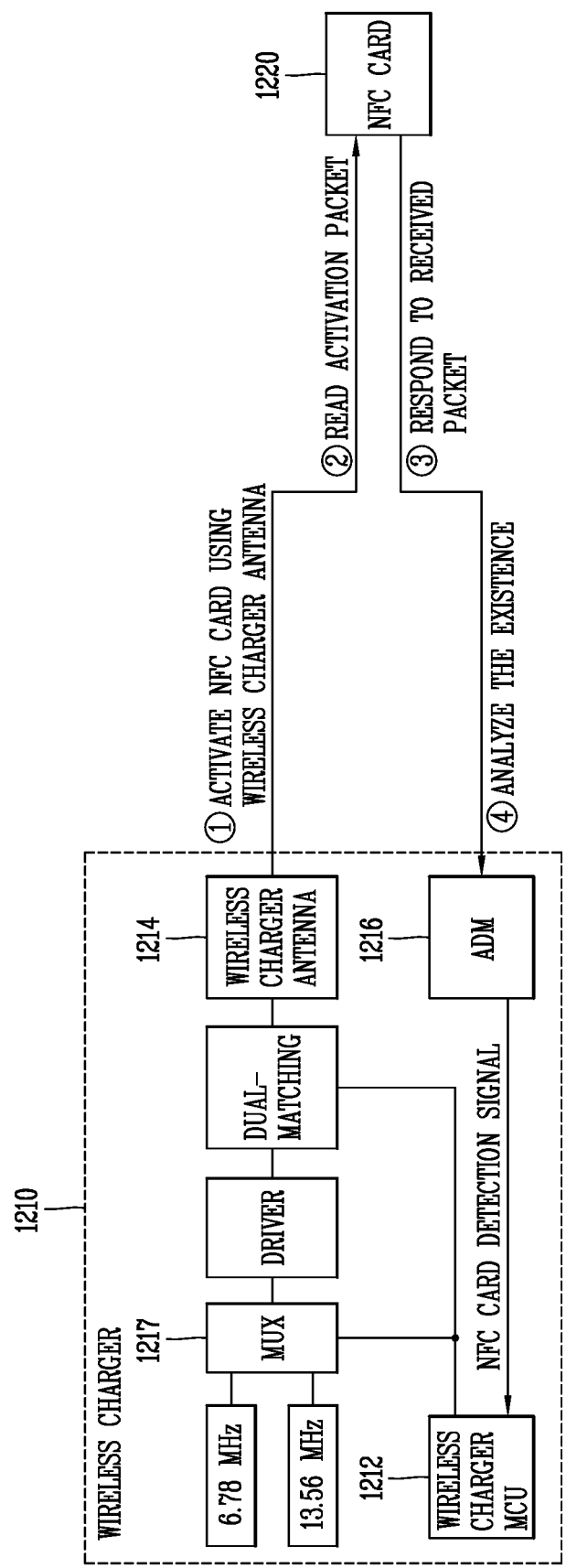
FIGS. 15A to 15C are block diagrams of a wireless power transmitter for executing the wireless power transfer method of FIG. 14, namely, a wireless power transmitter having a multiplexer.
Figure 15B:
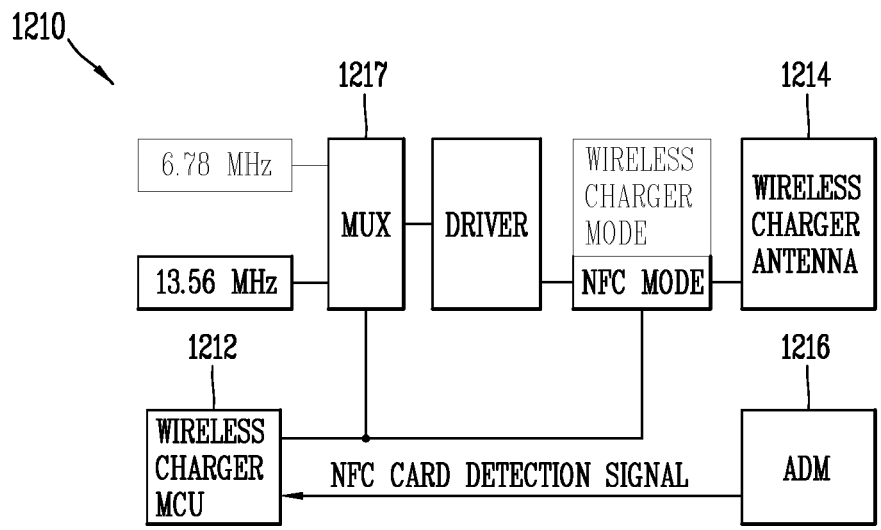

The wireless power receiver 200 in the identification and configuration phase 630 may transmit a power control message including its own identification information. For this purpose, the wireless power receiver 200, for instance, may transmit an identification packet 5200 including a message indicating the identification information of the wireless power receiver 200 as illustrated in FIG. 15A. The packet 5200 may include a header 5220 for notifying a packet indicating identification information and a message 5230 including the identification information of the electronic device. The message 5230 may include information (2531 and 5232) indicating a version of the contract for contactless power transfer, information 5233 for identifying a manufacturer of the wireless power receiver 200, information 5234 indicating the presence or absence of an extended device identifier, and a basic device identifier 5235. Furthermore, if it is displayed that an extended device identifier exists in the information 5234 indicating the presence or absence of an extended device identifier, then an extended identification packet 5300 including the extended device identifier as illustrated in FIG. 15B will be transmitted in a separate manner. The packet 5300 may include a header 5320 for notifying a packet indicating an extended device identifier and a message 5330 including the extended device identifier. When the extended device identifier is used as described above, information based on the manufacturer's identification information 5233, the basic device identifier 5235 and the extended device identifier 5330 will be used to identify the wireless power receiver 200.

The wireless power receiver 200 may transmit a power control message including information on expected maximum power in the identification and configuration phase 630. To this end, the wireless power receiver 200, for instance, may transmit a configuration packet 5400 as illustrated in FIG. 16. The packet may include a header 5420 for notifying that it is a configuration packet and a message 5430 including information on the expected maximum power. The message 5430 may include power class 5431, information 5432 on expected maximum power, an indicator 5433 indicating a method of determining a current of a main cell at the side of the wireless power transmitter, and the number 5434 of optional configuration packets. The indicator 5433 may indicate whether or not a current of the main cell at the side of the wireless power transmitter is determined as specified in the contract for wireless power transfer.

On the other hand, the wireless power transmitter 100 may generate a power transfer contract which is used for power charging with the wireless power receiver 200 based on the identification information and/or configuration information. The power transfer contract may include the limits of parameters determining a power transfer characteristic in the power transfer phase 640.

The wireless power transmitter 100 may terminate the identification and configuration phase 630 and return to the selection phase 610 prior to entering the power transfer phase 640. For instance, the wireless power transmitter 100 may terminate the identification and configuration phase 630 to find another electronic device that can receive power in a wireless manner.

4) Power Transfer Phase

The wireless power transmitter 100 in the power transfer phase 640 transmits power to the wireless power receiver 200.

Figure 17:
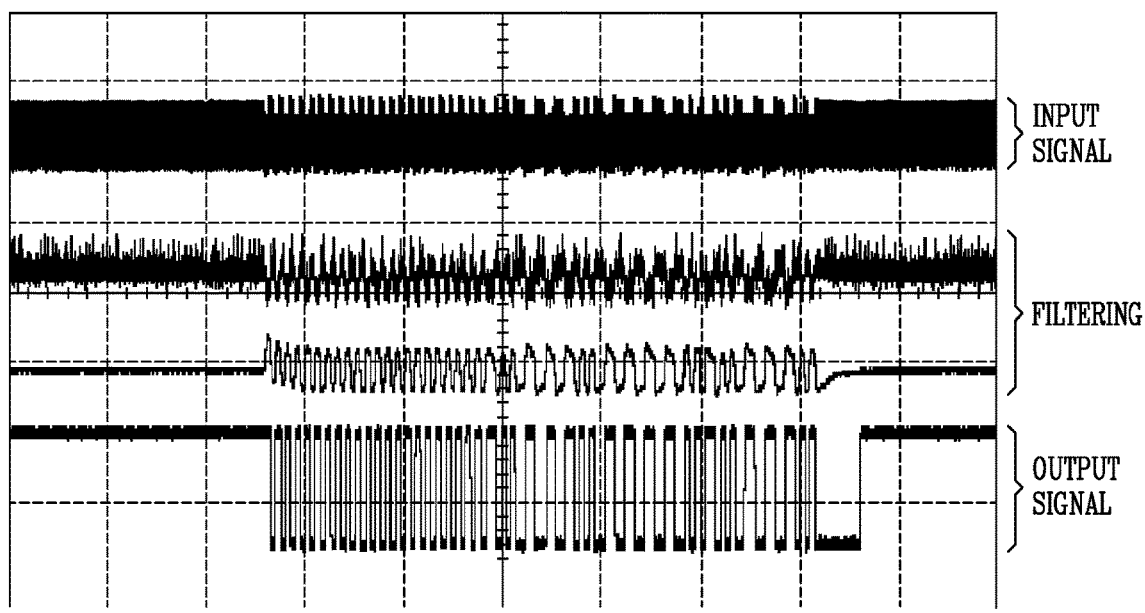
FIG. 17 is a view illustrating in more detail an NFC detecting unit described in FIGS. 15A to 16C.

The wireless power transmitter 100 may receive a power control message from the wireless power receiver 200 while transferring power, and control a characteristic of the power applied to the transmitting coil in response to the received power control message. For example, the power control message used to control a characteristic of the power applied to the transmitting coil may be included in a control error packet 5500 as illustrated in FIG. 17. The packet 5500 may include a header 5520 for notifying that it is a control error packet and a message 5530 including a control error value. The wireless power transmitter 100 may control the power applied to the transmitting coil according to the control error value. In other words, a current applied to the transmitting coil may be controlled so as to be maintained if the control error value is "0," reduced if the control error value is a negative value, and increased if the control error value is a positive value.

The wireless power transmitter 100 may monitor parameters within a power transfer contract generated based on the identification information and/or configuration information in the power transfer phase 640. As a result of monitoring the parameters, if power transmission to the wireless power receiver 200 violates the limits included in the power transfer contract, then the wireless power transmitter 100 may cancel the power transmission and return to the selection phase 610.

The wireless power transmitter 100 may terminate the power transfer phase 640 based on a power control message transferred from the wireless power receiver 200.

For example, if the charging of a battery has been completed while charging the battery using power transferred by the wireless power receiver 200, then a power control message for requesting the suspension of wireless power transfer will be transferred to the wireless power transmitter 100. In this case, the wireless power transmitter 100 may receive a message for requesting the suspension of the power transmission, and then terminate wireless power transfer, and return to the selection phase 610.

For another example, the wireless power receiver 200 may transfer a power control message for requesting renegotiation or reconfiguration to update the previously generated power transfer contract. The wireless power receiver 200 may transfer a message for requesting the renegotiation of the power transfer contract when it is required a larger or smaller amount of power than the currently transmitted power amount. In this case, the wireless power transmitter 100 may receive a message for requesting the renegotiation of the power transfer contract, and then terminate contactless power transfer, and return to the identification and configuration phase 630.

To this end, a message transmitted by the wireless power receiver 200, for instance, may be an end power transfer packet 5600 as illustrated in FIG. 20. The packet 5600 may include a header 5620 for notifying that it is an end power transfer packet and a message 5630 including an end power transfer code indicating the cause of the suspension. The end power transfer code may indicate any one of charge complete, internal fault, over temperature, over voltage, over current, battery failure, reconfigure, no response, and unknown error.

Hereinafter, with reference to FIGS. 13 to 20B, description will be given of a method of preventing damage on an electronic component provided in another device by using the wireless power transmitter 100 described with reference to FIGS. 1 to 12.

Figure 13:
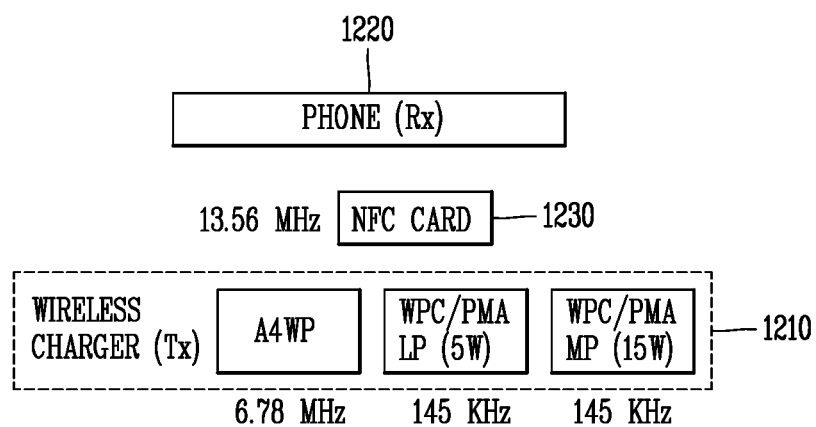
FIG. 13 is a view illustrating a problem caused when an NFC card is located between a wireless power transmitter and a wireless power receiver.

FIG. 13 is a view illustrating a problem caused when an NFC card is located between a wireless power transmitter and a wireless power receiver.

A wireless power transmitter (or wireless power transfer apparatus) 100 or 1210 may be provided with an interface surface in a flat shape for a wireless power transfer. At least one wireless power receiver 1220 may be placed on a top of the interface surface, and a transmitting coil may be mounted on a bottom of the interface surface.

When a foreign material such as a coin is present on the interface surface, power transfer efficiency may be lowered, and the foreign material may cause firing. Therefore, the wireless power transmitter may be provided with various sensors for detecting such foreign material, and allowed to execute wireless charging only after removing the foreign material.

The wireless power receiver 1220 is generally a portable mobile terminal. A user of the mobile terminal has a trend to attach a case to the mobile terminal for protecting the mobile terminal.

Accordingly, various types of cases are being developed, and also plural cases having a card inserting portion to serve as a wallet are currently provided. While using the unique function of the mobile terminal as it is, the user can insert a frequently-used card in the card inserting portion so as to purchase goods or use services by use of information included in the card.

The card is provided with a chip containing various types of information and an antenna, and executes data transmission and reception in a wireless manner. This technology is referred to as radio frequency identification (RFID), and a representative example is near field communication (NFC). In this specification, a card capable of performing communication with a frequency band regulated in NFC is referred to as 'NFC card.'

When the mobile terminal (or wireless power receiver) is placed on the interface surface in a state that the card is inserted in the case, an NFC card 1230 is located between the wireless power transmitter 1210 and the wireless power receiver 1220.

In the related art, the NFC card has not been classified as a foreign material when the wireless power transmitter performs wireless charging. However, according to recent experimental results, it has been confirmed that power of the wireless charging is induced through the antenna provided in the NFC card, and thereby causes damage on the NFC card when wireless charging is performed in the state where the NFC card is placed. It also has been confirmed that firing is likely to be made even by heat generated from the NFC card.

FIG. 13 illustrates an example of an NFC card using a frequency band of 13.56 MHz, but the NFC card may alternatively be replaced with any arbitrary electronic device using an arbitrary frequency band. That is, not only the NFC card but also any electronic device using an arbitrary frequency band may be damaged due to power transmitted from the wireless power transmitter 1210.

The present invention is to address this problem, namely, to provide a wireless power transmitter 1210 for searching for an electronic device, such as an NFC card, which is likely to be damaged due to wireless charging, and executing a control in a different manner according to the search result.

The wireless power transmitter 1210 transmits a wireless power signal for transferring power when the wireless power receiver 1220 is detected.

The wireless power transmitter 1210 may transfer power using at least one of an inductive coupling scheme based on a magnetic induction phenomenon by the wireless power signal and a magnetic resonance coupling scheme based on an electromagnetic resonance phenomenon by a wireless power signal of a specific frequency.

The wireless power transmitter 1210 may transfer power to the wireless power receiver 1220 according to a preset method, or may select any one of a plurality of methods and transfer power according to the selected method.

The wireless power transmitter 1210 may identify the wireless power receiver 1220 and determine at least one of frequency, voltage and current characteristics of the power conversion unit for generating the wireless power signal. The determination of the at least one characteristic may be made according to a condition on the side of the wireless power transmitter 1210 or on a condition on the side of the wireless power receiver 1220.

The plurality of methods may include a first method (using 6.78 MHz) specified in the A4WP standard, a second method (using 145 kHz and 5 W) specified in the WPC or PMA standard and/or a third method (using 145 kHz and 5 W). It is apparent that various methods for performing wireless charging can be applied to the wireless power transmitter 1210 of the present invention, in addition to the aforementioned methods.

As results of experimenting on wireless charging by the first to third methods in a state that the NFC card is present in an active area or detection area of the wireless power transmitter 1210, it has been confirmed that the NFC card is damaged when power is transferred by the first and third methods. On the other hand, it has been confirmed that the NFC card does not affect the wireless charging and damage on the NFC card is not caused when power is transferred by the second method.

The wireless power transmitter 1210 according to the present invention may prevent damage on an electronic component provided in another device by way of changing a power transfer method or controlling power not to be transferred when the NFC card is detected. Hereinafter, a related detailed method will be described later with reference to the accompanying drawings.

FIG. 14 is a flowchart illustrating a wireless power transfer method of a wireless power transmitter (or wireless power transfer apparatus) according to one embodiment of the present invention.

The wireless power transmitter 1210 includes a power conversion unit 111 and a power transmission control unit 112.

The power conversion unit 111 is configured to transmit a wireless power signal which is transmitted in a form of an energy field such as an electric field, a magnetic field, or an electromagnetic field, and includes a wireless charging coil (or a transmitting coil) 1111*a*.

The power transmission control unit 112 or 1212 is configured to transfer power to the wireless power receiver 1220 using the wireless power signal. The power transmission control unit 112 may be referred to as 'wireless charging MCU'. The wireless power transfer method illustrated in FIG. 14 may be executed by the power transmission control unit.

First, when a preset condition is satisfied, an NFC detection signal is transmitted using the wireless charging coil. The power transmission control unit 1212 controls the power conversion unit 111 so that the NFC detection signal is transmitted instead of a wireless power signal for transferring power.

Here, a case where the preset condition is satisfied is defined as a situation in which it is necessary to determine whether an object that is likely to be damaged due to wireless charging is present within a predetermined range before performing wireless charging or while performing the wireless charging.

For example, the case where the preset condition is satisfied may be a situation where a wireless charging request is received. When the wireless charging request is received from the wireless power receiver 1220 located within a predetermined range, it may correspond to the case where the preset condition is satisfied.

Here, the predetermined range may be the active area and/or the detection area, and may be variously modified according to embodiments.

In another example, the case where the preset condition is satisfied may be a case where an object is detected within the predetermined range in an inactive state in which wireless charging is not performed. That is, when an operation state of the wireless power transmission 1210 is switched from the inactive state to the selection phase 610, it may correspond to the case where the preset condition is satisfied.

In another example, the case where the preset condition is satisfied may be a case where the wireless power receiver 1220 is detected within the predetermined range in the inactive state in which wireless charging is not performed. When an arbitrary object is detected but the detected object is not the wireless power receiver 1220, it is determined that the preset condition is not satisfied. In this instance, the selection phase is switched back to the inactive state.

In another example, the case where the preset condition is satisfied may be a case where a temperature received from a temperature sensor is higher than a reference temperature. This is because heat is likely to be generated due to a foreign material other than the wireless power receiver 1220 when a temperature is higher than the reference temperature in the state where wireless charging is being performed.

In another example, an NFC detection signal may also be transmitted instead of a wireless power signal every unit time from a start point of activation in the active state in which wireless charging is performed. That is, the power transmission control unit 1212 may temporarily suspend the wireless charging every unit time during the wireless charging and transmit the NFC detection signal. This is to detect that a foreign material enters the predetermined range during the wireless charging.

In addition to those examples, various conditions may be set. The power transmission control unit 1212 may transmit the NFC detection signal when at least one of the various conditions is satisfied.

On the other hand, the NFC detection signal refers to a signal for detecting an NFC device, and is included in a frequency band of 13.56 MHz.

The NFC detection signal is an example, and the frequency band of the detection signal may vary depending on a type of a device to be searched. For example, a ZigBee detection signal may be a signal for detecting a ZigBee device and may be included in a frequency band of 2.4 GHz.

If a type of device to be detected is in plural, the power transmission control unit 1212 may control the power conversion unit 111 such that detection signals having different frequency bands are output in a preset order. Alternatively, the detection signal may consist of frequency-modulated continuous-waves and may be used to detect a specific device corresponding to a specific frequency band.

Hereinafter, for the same of explanation, a transmission of an NFC detection signal for searching for an NFC device will be described as an example of the present invention.

The NFC detection signal may be transmitted via a wireless charging coil that is used to transfer wireless power. That is, one of the wireless power signal and the NFC detection signal may be selectively transmitted through the wireless charging coil. The wireless power control unit 1212 may switch a frequency and a characteristic of an antenna to transmit the one signal. Accordingly, the wireless charging coil may operate at a frequency for wireless charging or at a frequency for NFC detection.

In general, in order to detect an NFC device, an antenna for detecting the NFC device should be provided. Since a communication antenna for performing short-range communication and a charging antenna for performing wireless charging must be provided, a separate space is required for the communication antenna, and an additional cost is needed accordingly.

In contrast, the wireless power transmitter 1210 according to the present invention uses a wireless charging coil corresponding to a charging antenna as a communication antenna for detecting an NFC device, if necessary. The NFC detection signal is thus transmitted through the wireless charging coil even if a separate communication antenna is not provided.

When the NFC detection signal is transmitted, the power conversion unit 111 modulates the NFC detection signal so that a packet is included in the NFC detection signal. The packet is demodulated by the NFC device which can perform near field communication (NFC).

Next, a response signal to the detection signal is detected (S1430).

The NFC device is designed to transmit a response signal in response to the NFC detection signal. When the communication antenna for NFC is provided, the response signal may be directly detected. However, the response signal cannot be detected by the wireless charging coil corresponding to the charging antenna.

The wireless power transmitter 1210 according to the present invention includes an NFC detection unit (not illustrated) for detecting the response signal. The NFC detection unit corresponds to a completely different component from the communication antenna, and is configured to detect distortion, caused by the response signal, from an energy field formed by the NFC detection signal. The NEC detection unit may be a demodulator that can be produced at a much lower cost than the communication antenna, and the demodulator includes at least one filter for detecting the distortion.

The NFC detection unit transmits to the power transmission control unit 1212 whether or not the response signal is detected.

The power transmission control unit 1212 controls the power conversion unit in a different manner depending on whether the response signal to the NFC detection signal is detected.

Specifically, when the response signal is detected within a predetermined time, the power transmission control unit 1212 controls the wireless charging coil such that the power transfer method is changed or power is not transferred (S1450).

The detection of the response signal refers to that the NFC device is present within a predetermined range. When a wireless power signal is transmitted, the NFC device may be damaged.

Accordingly, the power transmission control unit 1212 controls the power conversion unit 111 so that the power transfer method is changed or power is not transmitted to the wireless power receiver 1220.

For example, the power transmission control unit may be set to transmit a wireless power signal in a first manner. When a first wireless power receiver capable of receiving power in a first or second manner and the NFC device are simultaneously detected, the power transmission control unit 1212 transfers wireless power in the second manner other than the first manner that may damage the NFC device.

As another example, when a second wireless power receiver capable of receiving power in a first or third manner and the NFC device are simultaneously detected, a selectable power transfer method is not provided. Accordingly, the power transmission control unit 1212 restricts the wireless power signal from being transmitted through the power conversion unit 111.

Changing the power transfer method indicates that a method possibly causing damage on the NFC device is excluded and a method which is not likely to cause damage on the NFC device is selected among a plurality of power transfer methods.

The change in the power transfer method refers to a change in a frequency and/or unit power amount of a wireless power signal providing power.

When the power transfer method is changed, the power transmission control unit 1212 may control the power conversion unit to switch a frequency of the wireless power signal from one of a first frequency and a second frequency to another one. When the frequency of the wireless power signal is switched to the another one frequency, the transmission of the wireless power signal using the another one frequency is restricted. When the power transfer method is changed, the power transmission control unit may control the power conversion unit to restrict the wireless power signal from being transmitted using the first frequency and allow the wireless power signal to be transmitted using the second frequency. This is because the NFC device is damaged when the wireless power signal is transmitted using the one frequency.

When the NFC device is detected, charging by the magnetic resonance scheme is not allowed, and thus the power transfer method may be changed from the magnetic resonance method to a magnetic induction method.

Meanwhile, when the predetermined time elapses without a detection of the response signal, the wireless power signal is transmitted using the wireless charging coil (S1470).

That the response signal is not detected indicates that the NFC device that may be damaged due to wireless charging does not exist within a predetermined range. Therefore, the power transmission control unit 1212 controls the power conversion unit 111 to transmit the wireless power signal.

The wireless power signal for transferring power is transmitted when the NFC device is not present within the predetermined range. In the presence of the NFC device, the transmission of the wireless power signal is restricted. Therefore, damage on the NFC device is prevented in advance.

Further, the NFC detection signal for searching for the NFC device is transmitted through the wireless charging coil for transmitting the wireless power signal, and the response signal of the NFC device may be detected using a demodulator. Accordingly, a separate communication module for short-range communication may not be needed. The demodulator is implemented as a simple circuit but the communication module requires a large amount of cost and a large space as compared with the demodulator. Therefore, a production cost can be reduced.

Hereinafter, a method in which the power transfer control unit 1212 selectively transmits the wireless power signal or the NFC detection signal will be described in detail.

The wireless power transmitter 1210 may include a power transmission control unit 1212 (or wireless charger MCU), a demodulator 1216 or AMD, a wireless charging coil 1214, or a wireless charger antenna.

Figure 15C:
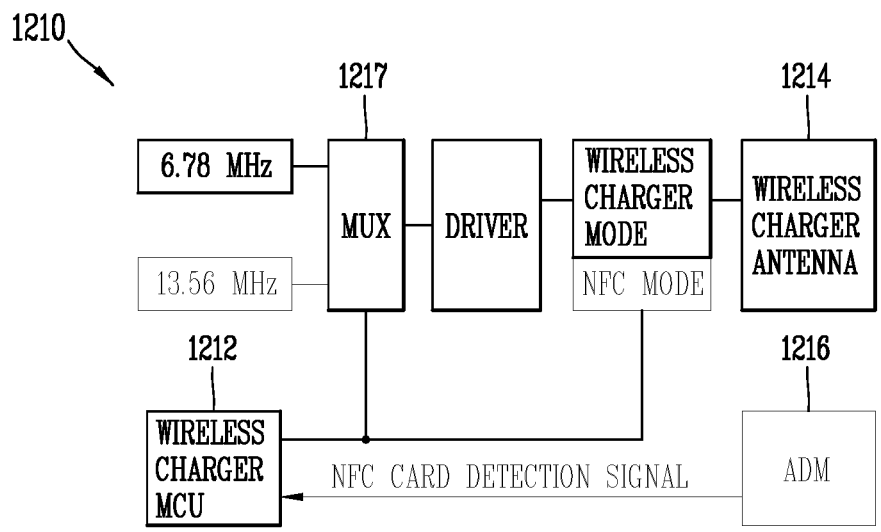

FIGS. 15A to 15C are block diagrams of a wireless power transmitter for performing the wireless power transmission method of FIG. 14, namely, a wireless power transmitter having a multiplexer.

Referring to FIG. 15A, the power transmission control unit 1212 switches a frequency and an antenna characteristic according to whether or not a preset condition is satisfied.

When a preset condition is satisfied, the wireless power transmitter 1210 generates an energy field using an NFC detection signal of 13.56 Mhz. The wireless power transmitter 1210 transmits a packet to the NFC device 1220 (or the NFC card) by generating distortion in the energy field.

The NFC device 1220 generates a response signal to the distortion of the energy field. The NFC device 1220 generates the response signal in a manner of generating the distortion in the energy field.

The demodulator 1216 (or analog demodulator) corresponding to the NFC detection unit included in the wireless power transmitter 1210 detects a response signal using the distortion of the energy field generated by the NFC device 1220. The demodulator detects a response signal by filtering only the packet generated by the NFC device 1220, through at least one filter, from a low frequency distortion generated in a high frequency electric field. The demodulator may be referred to as an analog demodulator in that it converts an analog signal to a digital signal.

The power transmission control unit 1212 may confirm whether or not the response signal is detected based on the digital signal transmitted from the demodulator 1216.

Meanwhile, the wireless power transmitter 1210 may additionally include a multiplexer 1217. As illustrated in FIGS. 15B and 15C, the multiplexer 1217 selectively transmits either one of the wireless power signal and the NFC detection signal to the power conversion unit based on the control of the power transmission control unit.

For example, a wireless power signal having a frequency band of 6.78 Mhz and/or an NFC detection signal having a frequency band of 13.56 MHz may be generated. The multiplexer 1217 transmits the wireless power signal or the NFC detection signal to the power conversion unit 111 under the control of the power transmission control unit 1212.

FIG. 15B is a block diagram of the wireless power transmitter 1210 operating in an NFC detection mode. The NFC detection signal (13.56 Mhz) is transmitted via a wireless charging coil 1214 instead of the wireless power signal (6.78 Mhz). When a response signal is detected by the demodulator 1216, the NFC detection mode is maintained, and the transmission of the wireless power signal is restricted.

On the contrary, FIG. 15C is a block diagram of the wireless power transmitter 1210 operating in a wireless charging mode. In this case, instead of the NFC detection signal, the wireless power signal is transmitted through the wireless charging coil 1214. In order to use power efficiently, the transmission of power to the demodulator 1216 may be restricted in the wireless charging mode.

Figure 16B:
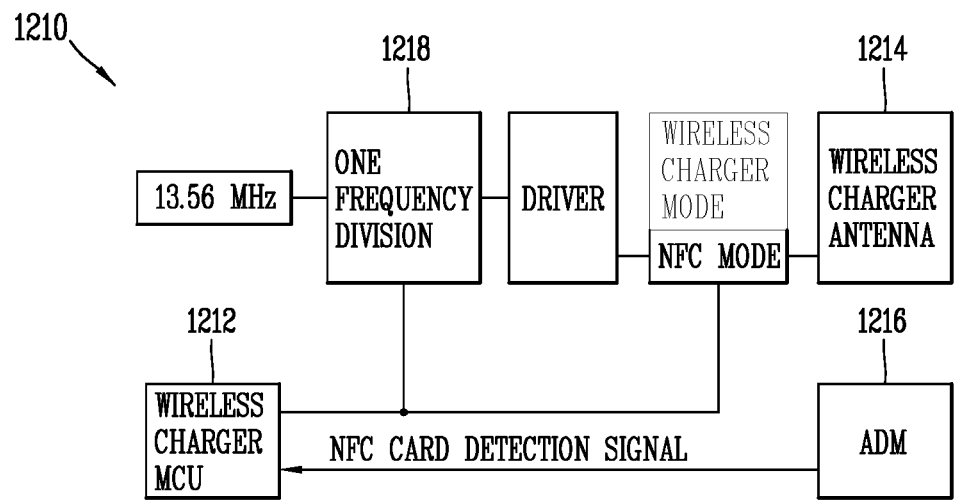
Figure 16C:
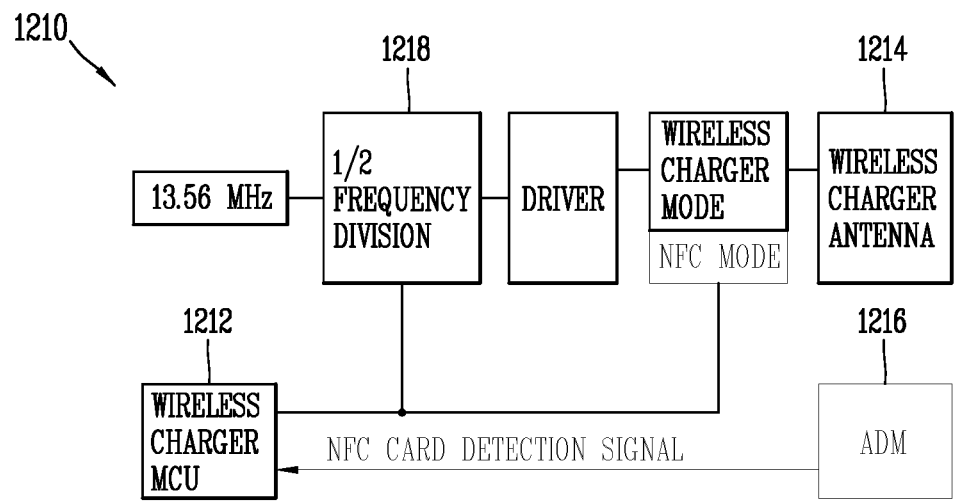

FIGS. 16A to 16C are block diagrams of the wireless power transmitter for performing the wireless power transmission method of FIG. 14, namely, the wireless power transmitter having a frequency divider.

Referring to FIG. 16A, the wireless power transmitter 1210 may include a frequency divider 1218 instead of the multiplexer 1217. The wireless power transmitter 1210 may generate a signal having one frequency, and the signal may be converted into a wireless power signal or an NFC detection signal using the frequency divider 1218. Specifically, the frequency divider 1218 is configured to generate the wireless power signal using the NFC detection signal based on the control of the power transmission control unit. Since the wireless power signal and the NFC detection signal have an integer ratio, different signals may be divided from one signal.

As illustrated in FIG. 16B, when operating in an NFC detection mode, the NFC detection signal (13.56 Mhz) is transmitted through the wireless charging coil 1214. When a response signal is detected by the demodulator 1216, the NFC detection mode is maintained, and the transmission of the wireless power signal is restricted.

On the contrary, as illustrated in FIG. 16C, when operating in a wireless charging mode, the NFC detection signal (13.56 Mhz) is divided so that the wireless power signal (6.78 Mhz) other than the NFC detection signal is transmitted through the wireless charging coil 1214.

FIG. 17 is a view illustrating the NFC detection unit described in FIGS. 15A to 16C in more detail.

The demodulator 1216 filters an analog input signal using at least one filter, and outputs an output signal converted into a digital signal. The filter may include at least one of a low pass filter, an amplifier, a comparator, and a level shifter.

The demodulator 1216 refers to a component that restores an original signal from a modulated carrier wave. When a signal is transmitted from a transmitting side, the signal is transmitted by changing an amplitude, frequency, or phase of the carrier wave, which is an electromagnetic wave easy to propagate through a space or a transmission line. The demodulator 1216 provided in a receiving side restores a signal that the transmitting side has desired to transmit from the modulated wave, namely, the electromagnetic wave in which the amplitude, frequency, or phase of the carrier wave has been changed.

Unlike an NFC antenna, the demodulator 1216 can be manufactured at low cost, and thus the fabrication cost of the wireless power transmitter 1210 can be significantly reduced.

Figure 18:
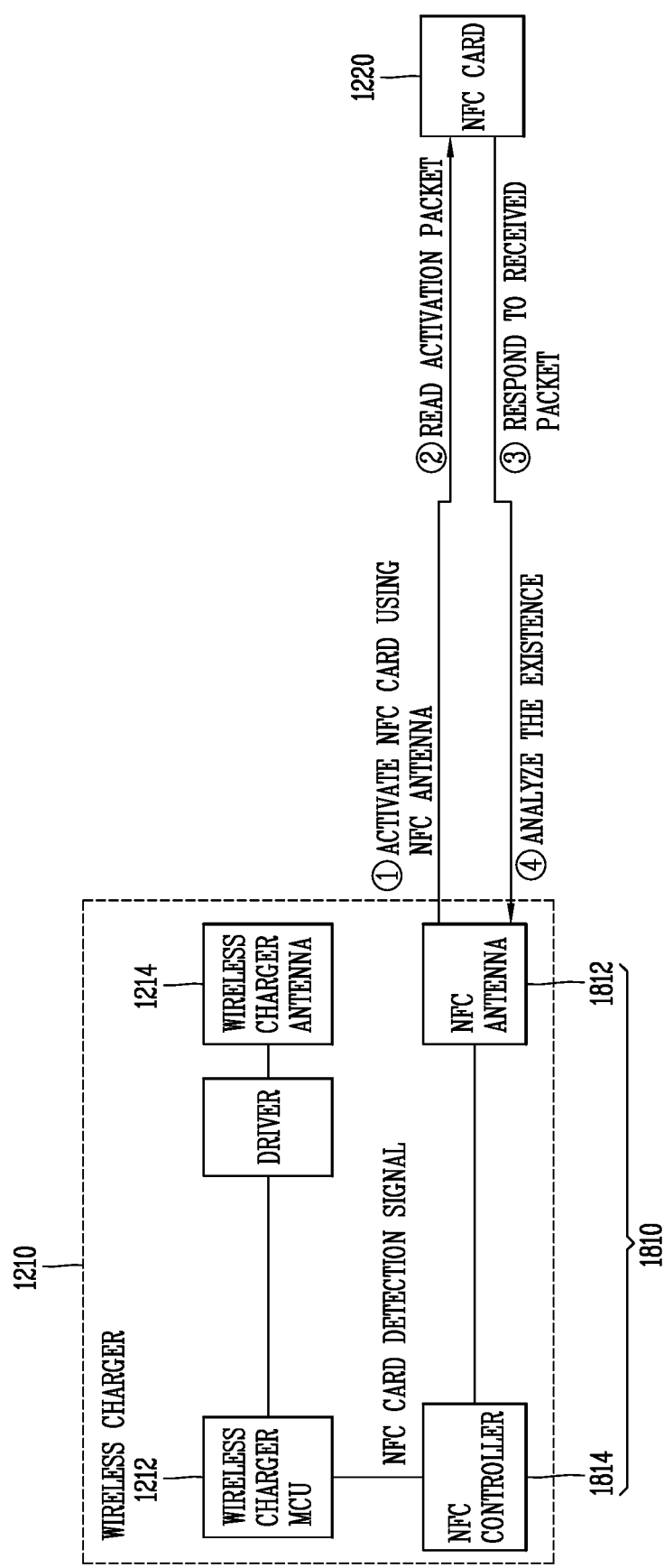
FIG. 18 is a block diagram of a wireless power transmitter for executing the wireless power transfer method of FIG. 14, namely, a wireless power transmitter having an NFC antenna.

FIG. 18 is a block diagram of a wireless power transmitter for performing the wireless power transmission method of FIG. 14, namely, a wireless power transmission apparatus having an NFC antenna.

The wireless power transmitter 1210 may be provided with a short-range communication module 1810 capable of performing short-range communication, instead of the demodulator 1216 described above.

The short-range communication module 1810 includes an NFC antenna 1812 configured to communicate with an NFC device and an NFC controller 1814 configured to perform a control related to the communication.

When the NFC detection mode starts, the NFC controller 1814 transmits an NFC detection signal using the NFC antenna 1812 and receives a response signal transmitted from the NFC device 1220. When the NFC device 1220 is detected, the NFC controller 1814 requests the power transmission control unit 1212 to maintain the NFC detection mode. In response to the request from the NFC controller 1814, the power transmission control unit 1212 may restrict the transmission of a wireless power signal through a wireless charging coil in response to the request or change the power transfer method.

Figure 19:
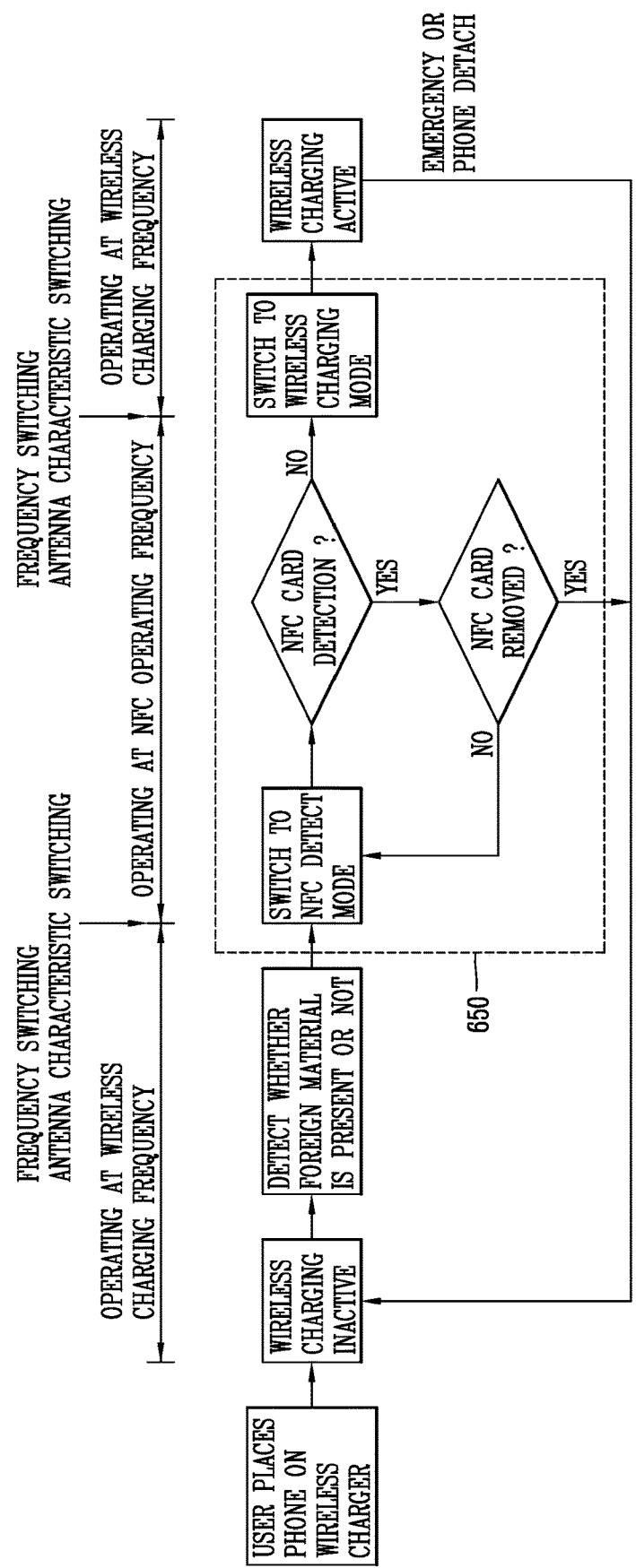
FIG. 19 is a flowchart illustrating a wireless power transfer method in more detail.

FIG. 19 is a flowchart illustrating the wireless power transfer method in more detail.

Referring to FIG. 19, the wireless power transmitter 1210 may detect that an object is placed on the interface surface. The wireless power transmitter 1210 identifies a type of the object using a wireless charging signal, in response to the object being placed on the interface surface. Whether or not a foreign material obstructing wireless charging is present on the interface surface may also be detected by the wireless charging signal.

When the object placed on the interface surface is a wireless power receiver 1220 and a foreign material is not present, the power transmission control unit 1212 switches a wireless charging mode into an NFC detection mode. As the NFC detection mode is executed, a frequency and an antenna characteristic are switched and an NFC detection signal is transmitted instead of a wireless power signal. An operation for NFC detection is executed in the NFC detection mode, the NFC detection signal is transmitted through a wireless charging coil, and a response signal is detected through a demodulator.

When the response signal is detected within a predetermined time, the NFC detection mode is continuously executed. When the response signal is not detected, the NFC detection mode is switched into a wireless charging mode, and accordingly the power transfer phase 640 starts.

The NFC detection mode may be referred to as an NFC detection phase 650 and an NFC device should not be detected in the NFC detection phase 650 in order to start the power transfer phase 640. That is, the power transfer phase 640 starts only when the NFC device is not detected in the NFC detection phase.

The wireless power transmitter 1210 according to one embodiment described herein may be installed in a vehicle and transmit a wireless power signal using a battery provided in the vehicle. Thus, the invention described herein can extend up to the vehicle having the wireless power transmitter 1210.

Figure 20A:
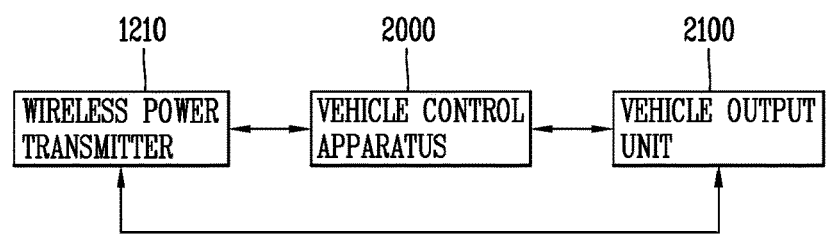
FIGS. 20A and 20B are views illustrating a vehicle having a wireless power transmitter.
Figure 20B:
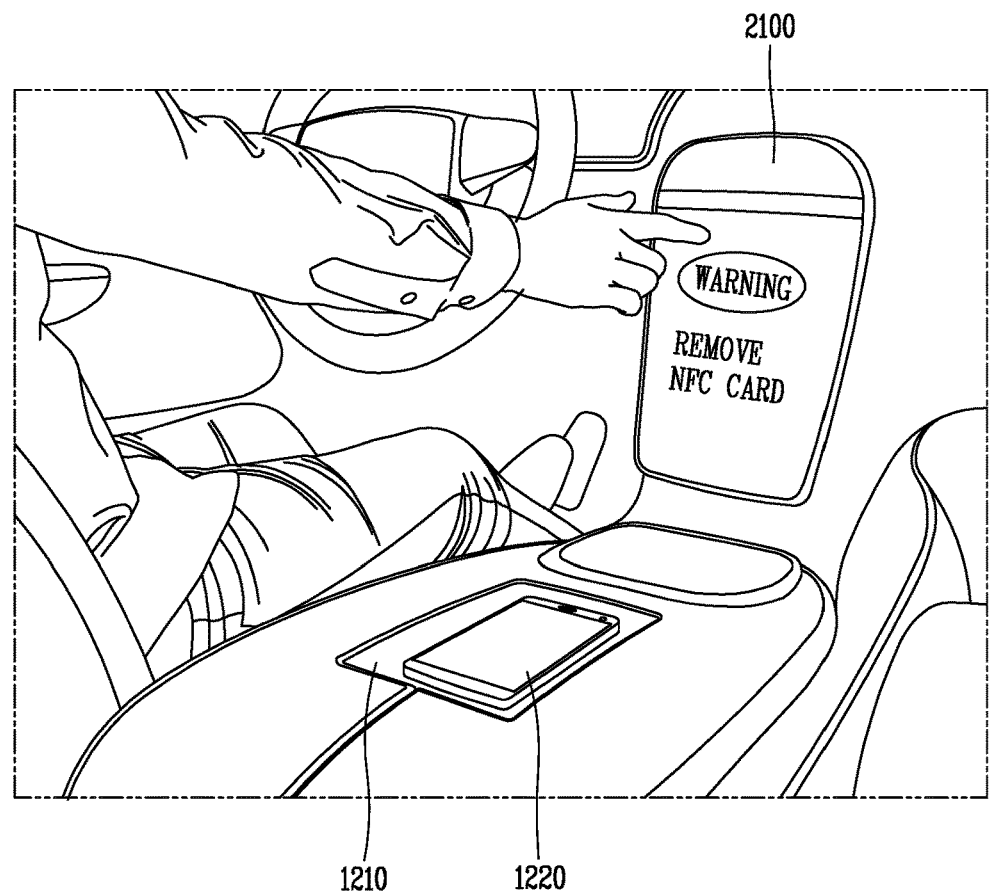

FIGS. 20A and 20B are views illustrating a vehicle equipped with a wireless power transmitter.

As illustrated in FIG. 20A, the wireless power transmitter 1210 may perform communication with a vehicle control apparatus 2000 provided in the vehicle or with a vehicle output unit 2100 provided in the vehicle. For example, the wireless power transmitter 1210 may transmit notification information to the vehicle control apparatus 2000 and/or the vehicle output unit 2100 to inform an operation state. The vehicle output unit 2100 may include a video output unit and/or an audio output unit, and may output guidance information related to the operation of the wireless power transmitter 1210 based on the notification information.

Further, when a response signal is detected in an NFC detection mode, the power transmission control unit 1212 of the wireless power transmitter 1210 may output a notification signal notifying that an NFC device has been detected. The vehicle output unit 2100 may output guidance information related to the NFC device based on the notification signal.

For example, information indicating that low-speed charging is being performed because quick charging is impossible due to a detection of the NFC device, information indicating that wireless charging is allowed only after the NFC device is removed, and the like are output on the vehicle output unit 2100 as the guidance information.

The present invention can be implemented as a computer-readable code (application or software) in a program-recorded medium. The control method of the autonomous vehicle may be realized by a coded stored in a memory or the like.

The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include a processor or a controller. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A wireless power transmitter for performing communication with a wireless power receiver, the wireless power transmitter comprising:
   a power conversion unit configured to transmit a wireless power signal transferred in a form of an energy field; and
   a power transmission control unit configured to transfer power to the wireless power receiver using the wireless power signal,
   wherein the power transmission control unit is configured to control the power conversion unit to transmit a near-field communication (NFC) detection signal, other than the wireless power signal, when a preset condition is satisfied,
   wherein the power transmission control unit controls the power conversion unit in a different manner according to whether or not a response signal to the NFC detection signal is detected,
   wherein the wireless power transmitter further comprises a frequency divider configured to generate the wireless power signal using the NFC detection signal based on the control of the power transmission control unit,
   wherein the power conversion unit comprises a coil, and
   wherein one of the wireless power signal and the NFC detection signal is selectively transmitted through the coil.

2. The wireless power transmitter of claim 1, wherein the power transmission control unit controls the power conversion unit such that a power transfer method is changed or power is not transferred to the wireless power receiver, when the response signal is detected.

3. The wireless power transmitter of claim 2, wherein the power transmission control unit controls the power conversion unit to switch a frequency of the wireless power signal from one of a first frequency and a second frequency into another one when the power transfer method is changed, and
   wherein the power transmission control unit restricts the transmission of the wireless power signal using the one frequency when the frequency of the wireless power signal is switched into the another one.

4. The wireless power transmitter of claim 1, wherein the power transmission control unit restricts the transmission of the wireless power signal through the power conversion unit when the response signal to the NFC detection signal is detected.

5. The wireless power transmitter of claim 1, further comprising an NFC detection unit configured to detect distortion generated by the response signal from the energy field formed by the NFC detection signal.

6. The wireless power transmitter of claim 5, wherein the NFC detection unit is a demodulator having at least one filter for detecting the distortion.

7. The wireless power transmitter of claim 1, wherein the power conversion unit modulates the NFC detection signal such that a packet is included in the NFC detection signal, when the NFC detection signal is transmitted, and
   wherein the packet is formed to be demodulated by an NFC device allowed to perform NFC communication.

8. The wireless power transmitter of claim 1, further comprising a multiplexer configured to selectively transmit one of the wireless power signal and the NFC detection signal to the power conversion unit based on the control of the power transmission control unit.

9. The wireless power transmitter of claim 1, wherein the wireless power signal and the NFC detection signal have an integer ratio therebetween.

10. The wireless power transmitter of claim 1, wherein the case where the preset condition is satisfied corresponds to a case where a temperature received from a temperature sensor is higher than a reference temperature.

11. The wireless power transmitter of claim 1, wherein the power transmission control unit outputs notification information notifying that an NFC device has been detected, when the response signal is detected.

12. A wireless power transfer method of a wireless power transmitter for transferring power to a wireless power receiver, the method comprising:
   transmitting a near-field communication (NFC) detection signal using a wireless charging coil when a wireless charging request is received;
   detecting a response signal to the NFC detection signal;
   controlling the wireless charging coil not to transfer power to the wireless power receiver, when the response signal is detected within a predetermined time; and
   transmitting a wireless power signal using the wireless charging coil to transfer power to the wireless power receiver when the predetermined time elapses without a detection of the response signal,
   wherein the wireless power signal is generated from the NFC detection signal by a frequency divider, and
   wherein the wireless power signal and the NFC detection signal have an integer ratio therebetween.

13. The method of claim 12, wherein one of the wireless power signal and the NFC detection signal is selectively transmitted through the wireless charging coil.

14. The method of claim 12, wherein the detecting the response signal comprises:
   detecting distortion, generated by the response signal, from an energy field formed by the NFC detection signal using a demodulator having at least one filter; and
   detecting the response signal using the distortion.

15. The method of claim 12, further comprising modulating the NFC detection signal such that a packet is included in the NFC detection signal, when the NFC detection signal is transmitted,
   wherein the packet is demodulated by an NFC device allowed to perform near-field communication (NFC).

16. The method of claim 12, wherein one of the wireless power signal and the NFC detection signal is selectively transmitted to the wireless charging coil by a multiplexer.

17. The method of claim 12, further comprising outputting notification information notifying that an NFC device has been detected when the response signal is detected.

* * * * *